United States Patent
Eshita

(10) Patent No.: US 10,659,674 B2
(45) Date of Patent: May 19, 2020

(54) IMAGING DEVICE, CONTROL METHOD, AND PROGRAM

(71) Applicant: Sony Corporation, Tokyo (JP)

(72) Inventor: Shiro Eshita, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 16/168,241

(22) Filed: Oct. 23, 2018

(65) Prior Publication Data
US 2019/0058824 A1   Feb. 21, 2019

Related U.S. Application Data

(63) Continuation of application No. 14/906,040, filed as application No. PCT/JP2014/070889 on Aug. 7, 2014, now Pat. No. 10,136,045.

(30) Foreign Application Priority Data

Aug. 19, 2013 (JP) ................................. 2013-169727
Aug. 20, 2013 (JP) ................................. 2013-170487
(Continued)

(51) Int. Cl.
*H04N 5/232*   (2006.01)
*H04N 5/225*   (2006.01)
(Continued)

(52) U.S. Cl.
CPC ....... *H04N 5/23209* (2013.01); *H04B 5/0031* (2013.01); *H04M 1/7253* (2013.01);
(Continued)

(58) Field of Classification Search
CPC .............. H04B 5/0031; H04M 1/7253; H04M 2250/04; H04N 5/2251; H04N 5/2254; H04N 5/23203; H04N 5/23209
See application file for complete search history.

(56) References Cited

U.S. PATENT DOCUMENTS 6,101,339 A    8/2000  Miki et al.
7,129,984 B1 * 10/2006  Okada ..................... G03B 7/16
                                                      348/372
(Continued)

FOREIGN PATENT DOCUMENTS

CN    101674407 A    3/2010
JP    62-062667 A    3/1987
(Continued)

OTHER PUBLICATIONS

EPO Communication Pursuant to Article 94(3) EPC dated Nov. 6, 2015 for corresponding European Application No. 14 166 056.3.
(Continued)

*Primary Examiner* — Amy R Hsu
(74) *Attorney, Agent, or Firm* — Oblon, McClelland, Maier & Neustadt, L.L.P.

(57) ABSTRACT

An imaging device, a control method, and a program with automatic power-on control in response to contactless communication are disclosed. An imaging preparation operation is performed after the completion of a transmission of connection information for a wireless communication connection. In one example, an imaging device includes a contactless communication part configured to perform contactless communication with an external device, and a control part configured to control power-on/off of the imaging device and an imaging preparation operation. The control part performs control to set the power of the imaging device ON upon detecting a polling command transmitted by the contactless communication from the external device, transmits connection information for wireless communication connection with the external device to the external device after the imaging device is powered on, and performs control such that the imaging preparation operation is per-
(Continued)

formed, when the transmission of the connection information is completed.

18 Claims, 17 Drawing Sheets

(30)     Foreign Application Priority Data

Aug. 23, 2013  (JP) ................................ 2013-173891
Sep. 17, 2013  (JP) ................................ 2013-192269
Jan. 28, 2014  (JP) ................................ 2014-013384

(51) Int. Cl.
  *H04M 1/725*  (2006.01)
  *H04B 5/00*   (2006.01)
(52) U.S. Cl.
  CPC ......... *H04N 5/2251* (2013.01); *H04N 5/2254* (2013.01); *H04N 5/23203* (2013.01); *H04N 5/23241* (2013.01); *H04M 2250/04* (2013.01)

(56)     References Cited

U.S. PATENT DOCUMENTS

| | | | |
|---|---|---|---|
| 8,271,662 B1* | 9/2012 | Gossweiler, III | ... H04M 1/6066 709/227 |
| 9,282,297 B2* | 3/2016 | Siann | ...... H04N 7/183 |
| 2005/0186988 A1* | 8/2005 | Lim | .................. H04N 21/4126 455/557 |
| 2005/0206748 A1 | 9/2005 | Kato | |
| 2006/0233545 A1 | 10/2006 | Senda et al. | |
| 2006/0239236 A1 | 10/2006 | Otsuka | |
| 2006/0268158 A1 | 11/2006 | Ishiyama et al. | |
| 2007/0040894 A1 | 2/2007 | Kikugawa | |
| 2007/0098385 A1 | 5/2007 | Tanaka et al. | |
| 2007/0147815 A1 | 6/2007 | Tanaka | |
| 2007/0166027 A1 | 7/2007 | Misawa | |
| 2007/0268371 A1 | 11/2007 | Misawa et al. | |
| 2008/0192114 A1* | 8/2008 | Pearson | ................. G03B 17/08 348/81 |
| 2009/0169030 A1 | 7/2009 | Inohara | |
| 2010/0130132 A1* | 5/2010 | Lee | ........................... H04B 5/02 455/41.3 |
| 2010/0271508 A1* | 10/2010 | Niizato | ................... H04N 5/232 348/231.99 |
| 2011/0109789 A1* | 5/2011 | Himuro | .............. H04N 1/00249 348/360 |
| 2011/0171907 A1* | 7/2011 | Jolivet | ................ H04L 63/0492 455/41.1 |
| 2012/0077433 A1 | 3/2012 | Walker et al. | |
| 2012/0140088 A1* | 6/2012 | Clark | ..................... G03B 15/05 348/211.2 |
| 2013/0009746 A1* | 1/2013 | Ryu | ................. H04M 1/72533 340/4.3 |
| 2013/0057694 A1* | 3/2013 | Petricoin, Jr. | ............ H04N 7/18 348/155 |
| 2013/0083211 A1 | 4/2013 | Kunishige et al. | |
| 2013/0107062 A1 | 5/2013 | Okazaki | |
| 2013/0141640 A1 | 6/2013 | Kim et al. | |
| 2014/0120833 A1* | 5/2014 | Hillan | .................. H04B 5/0031 455/41.1 |
| 2014/0181535 A1* | 6/2014 | Smith | ................... H04W 12/06 713/300 |

FOREIGN PATENT DOCUMENTS

| | | | |
|---|---|---|---|
| JP | 07-199031 A | 8/1995 |
| JP | 08-331434 A | 12/1996 |
| JP | 09-134610 A | 5/1997 |
| JP | 2003-156790 A | 5/2003 |
| JP | 2005-164845 A | 6/2005 |
| JP | 2005-341119 A | 12/2005 |
| JP | 2007-101886 A | 4/2007 |
| JP | 2007-279485 A | 10/2007 |
| JP | 2007-279486 A | 10/2007 |
| JP | 2007-306433 A | 11/2007 |
| JP | 2008-193457 A | 8/2008 |
| JP | 2008-271151 A | 11/2008 |
| JP | 2009-207069 A | 9/2009 |
| JP | 2010-45689 A | 2/2010 |
| JP | 2010-232827 A | 10/2010 |
| JP | 2011-182449 A | 9/2011 |
| JP | 2013-157737 A | 8/2013 |
| WO | WO-2004/054241 A1 | 1/2010 |
| WO | WO-2010/001712 A1 | 1/2010 |
| WO | WO 2012/115253 A1 | 8/2012 |

OTHER PUBLICATIONS

Japanese Office Action dated Jan. 5, 2016 for corresponding Japanese Application No. 2015-086038.
Japanese Office Action dated May 24, 2016 for corresponding Japanese Application No. 2015-086038.
European Patent Office Communication Pursuant to Article 94(3) dated May 3, 2016 for corresponding European Application No. 14 166 054.8.
European Patent Office Communication Pursuant to Article 94(3) dated Jun. 7, 2016 for corresponding European Application No. 14 166 056.3.
European Examination Division Brief Communication dated Mar. 29, 2017 for corresponding European Application No. 14166054.8.
Extended European Search Report dated May 12, 2017 for corresponding European Application No. 14838186.6.
European Patent Office Communication—Summons to Attend Oral Hearing Pursuant to Rule 115(1) EPC dated Jun. 14, 2017 for corresponding European Application No. 14166056.3.
Extended European Search Report dated Jan. 22, 2018 in Patent Application No. 17196929.8.
Brief Communication dated Dec. 1, 2017 in European Patent Application No. 14166056.3.
Japanese Office Action dated Feb. 6, 2018 in Patent Application No. 2014-056236, 6 pages.
Office Action dated Apr. 10, 2018 in Japanese Patent Application No. 2015-532805 (with unedited computer generated English translation).
Office Action dated May 14, 2018 in European Patent Application No. 14 838 186.6.
Office Action dated Apr. 16, 2018 in Chinese Patent Application No. 201480044479.7 (with unedited computer generated English translation).
Office Action dated Apr. 8, 2019 in corresponding European Patent Application No. 17 196 929.8, 6 pages.

* cited by examiner

Completion of sending of connection information etc.

IMAGING DEVICE, CONTROL METHOD, AND PROGRAM

CROSS REFERENCE TO RELATED APPLICATIONS

This application is a continuation of U.S. patent application Ser. No. 14/906,040, filed Jan. 19, 2016, which is based on PCT Application No. PCT/JP2014/070889, filed Aug. 7, 2014, which claims the benefit of Japanese Priority Patent Application No. JP 2013-169727 filed Aug. 19, 2013, Japanese Priority Patent Application No. 2013-170487, filed Aug. 20, 2013, Japanese Priority Patent Application No. 2013-173891, filed Aug. 23, 2013, Japanese Priority Patent Application No. 2013-192269, filed Sep. 17, 2013, and Japanese Priority Patent Application No. 2014-013384, filed Jan. 28, 2014, the entire contents of which are incorporated herein by reference.

TECHNICAL FIELD

The present disclosure relates to an imaging device, a control method, and a program.

BACKGROUND ART

In recent years, video camera devices having a remotely-controlled function have been proposed. For example, Patent Document 1 below proposes a video camera device that captures images according to an image capture signal transmitted from a remote controller by wireless communication and then transmits the captured images to the remote controller side.

Further, a system is also proposed in which remote control for image capture of a digital camera is performed by using an image processing terminal (smartphone, mobile phone unit, or the like) that performs wireless communication with the digital camera and implements an application having a function capable of remotely controlling image capture.

Patent Document 1: Japanese Patent Application Laid-open No. Hei 8-331434

SUMMARY OF INVENTION

Problem to be Solved by the Invention

However, in the system in which the remote control of the digital camera is performed using the image processing terminal described above, it was cumbersome to perform a power-on operation of the digital camera, an operation of activating an application in the image processing terminal, an operation of connecting the digital camera and the image processing terminal by wireless communication, and the like.

In this regard, the present disclosure proposes an imaging device, a control method, and a program that are capable of automatically performing power-on control in response to contactless communication and performing an imaging preparation operation after transmission of connection information for a wireless communication connection is completed.

Means for Solving the Problem

According to an aspect of the present technology, there is provided an imaging device including: a contactless communication part configured to perform contactless communication with an external device; a wireless communication part configured to perform wireless communication with the external device; and a control part configured to control power-on of the imaging device and connection of the wireless communication, in which the control part performs control to set the power of the imaging device ON upon detecting a signal by the contactless communication from the external device, transmits connection information for the wireless communication with the external device to the external device after the imaging device is powered on, and performs control such that connection by the wireless communication with the external device is made.

The control part may perform control such that the imaging device is powered on, when a polling command transmitted as a signal by the contactless communication is detected from the external device, and perform control such that an imaging preparation operation is performed, when the transmission of the connection information is complete.

The control part may perform control such that the imaging device is powered off, after the imaging device is powered on and when the transmission of the connection information is not completed within a predetermined period of time.

The control part may perform control such that information for specifying an application activated in the external device is transmitted together with the connection information.

The control part may perform control such that the imaging device is powered on and the imaging preparation operation is performed, when an operation of a power button by a user is detected.

The imaging preparation operation may be an operation involving a change in appearance or a notification of activation to a user.

The imaging preparation operation involving the change in appearance may be an operation of driving a collapsible lens.

The imaging preparation operation involving the notification of activation to a user may be an operation of reproducing a start-up sound.

The imaging preparation operation involving the notification of activation to a user may be an operation of emitting light from a power lamp.

The contactless communication may be near field communication (NFC).

The wireless communication may be wireless fidelity (Wi-Fi) communication.

According to an aspect of the present technology, there is provided a control method including: detecting a signal by contactless communication from an external device; performing control such that the imaging device is powered on; transmitting connection information for the wireless communication with the external device to the external device after the imaging device is powered on; and performing control such that connection by the wireless communication with the external device is made.

According to an aspect of the present technology, there is provided a program causing a computer to function as: a contactless communication part configured to perform contactless communication with an external device; a wireless communication part configured to perform wireless communication with the external device; and a control part configured to control power-on of an imaging device and connection of the wireless communication, in which the control part performs control to set the power of the imaging device ON upon detecting a signal by the contactless communication from the external device, transmits connection information for the wireless communication with the external device to the external device after the imaging device is powered on, and performs control such that connection by the wireless communication with the external device is made.

In the imaging device, the control method, and the program according to the aspects of the present technology, the signal by the contactless communication is detected from the external device, control is performed such that the imaging device is powered on, the connection information for the wireless communication with the external device is transmitted to the external device after the imaging device is powered on, and control is performed such that the connection by the wireless communication with the external device is made.

Effects of the Invention

As described above, according to the present disclosure, it is possible to automatically perform the power-on control in response to the contactless communication and perform the imaging preparation operation after the transmission of the connection information for the wireless communication connection is completed.

It should be noted that the effects described above are not necessarily limited, and in addition to or instead of the effects described above, any of the effects described in this specification or another effect that may be understood from this specification may be produced.

MODE(S) FOR CARRYING OUT THE INVENTION

Hereinafter, suitable embodiments of the present disclosure will be described in detail with reference to the attached drawings. It should be noted that in this specification and the drawings, constituent elements having substantially the same functional configuration are denoted by the same reference symbols and overlapping description thereof will be omitted.

Further, description will be given in the following order.
1. Overview of Digital Camera According to Embodiment of the Present Disclosure
2. Basic Configuration
3. Operation Processing
   3-1. Operation Processing of Digital Camera
   3-2. Operation Processing of Control System
4. Other Embodiments
5. Conclusion «1. Overview of Digital Camera According to Embodiment of the Present Disclosure»

Figure 1:
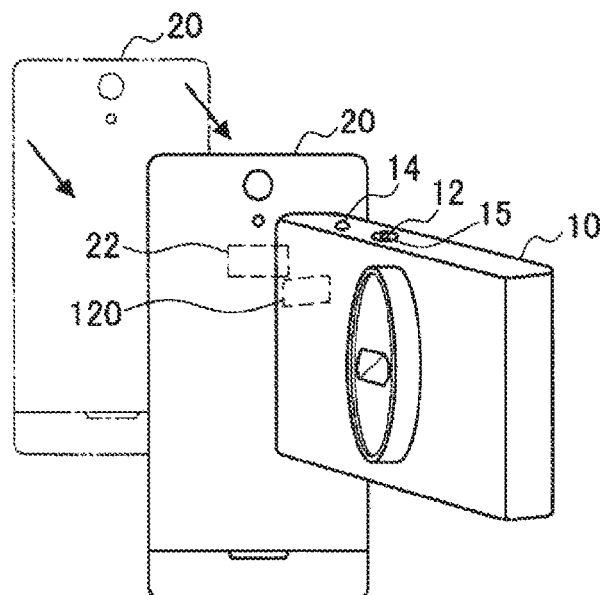
FIG. 1 is a diagram for describing the overview of a digital camera according to an embodiment of the present disclosure.
Figure 1:
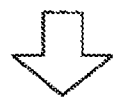
Figure 1:
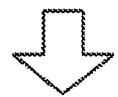
Figure 1:
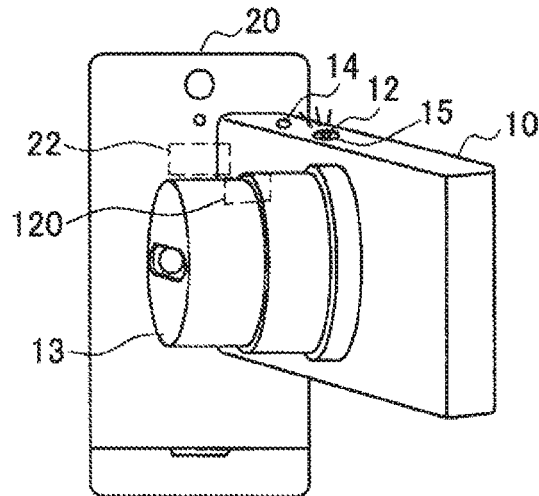

First, the overview of a digital camera according to an embodiment of the present disclosure will be described with reference to FIG. 1. A digital camera 10 illustrated in FIG. 1 is an example of an imaging device according to the present disclosure. It should be noted that the imaging device according to the present disclosure is not limited to the digital camera 10 and may be a digital video camera, for example.

A power button 15 and a shutter button 14 are provided on the upper surface of the digital camera 10. Additionally, a power lamp 12 is provided integrally with the power button 15. Lighting-up of the power lamp 12 notifies a user of a power-on state of the digital camera 10.

Further, an NFC (Near Field Communication) part (NFC tag) 120 that performs NFC is mounted in the digital camera 10. The NFC part 120 performs contactless communication with an NFC part mounted in an adjacent external device. In the example illustrated in FIG. 1, in the case where a communication terminal 20 such as a smartphone comes close, an NFC part 22 mounted in the communication terminal 20 and the NFC part 120 of the digital camera 10 perform contactless communication.

The NFC part 22 mounted in the communication terminal 20 cooperates with an NFC antenna, to perform NFC with the adjacent digital camera 10. Specifically, the NFC part 22 transmits radio waves that reach a close range of approximately several cm to several tens of cm, or depending on the design, approximately 7 mm, from the NFC antenna, and drives an NFC antenna 121 of the digital camera 10 (see FIG. 4) within a radio wave reach range, thus performing the NFC with the digital camera 10.

As illustrated in the upper part of FIG. 1, when the communication terminal 20 comes close to the digital camera 10 in a power-off state, the digital camera 10 is powered on (power-on) in response to NFC and is activated. The digital camera 10 then performs a wireless communication connection such as Wi-Fi (Wireless Fidelity) in response to a request from the communication terminal 20. On the communication terminal 20 side, a predetermined application is activated and a linkage function of the digital camera 10 and the communication terminal 20 is executed.

(Background)

Here, description will be given on a problem in the flow of a series of operations from the power-on of the digital camera 10 to the execution of linkage, with reference to FIGS. 2 and 3.

Figure 2:
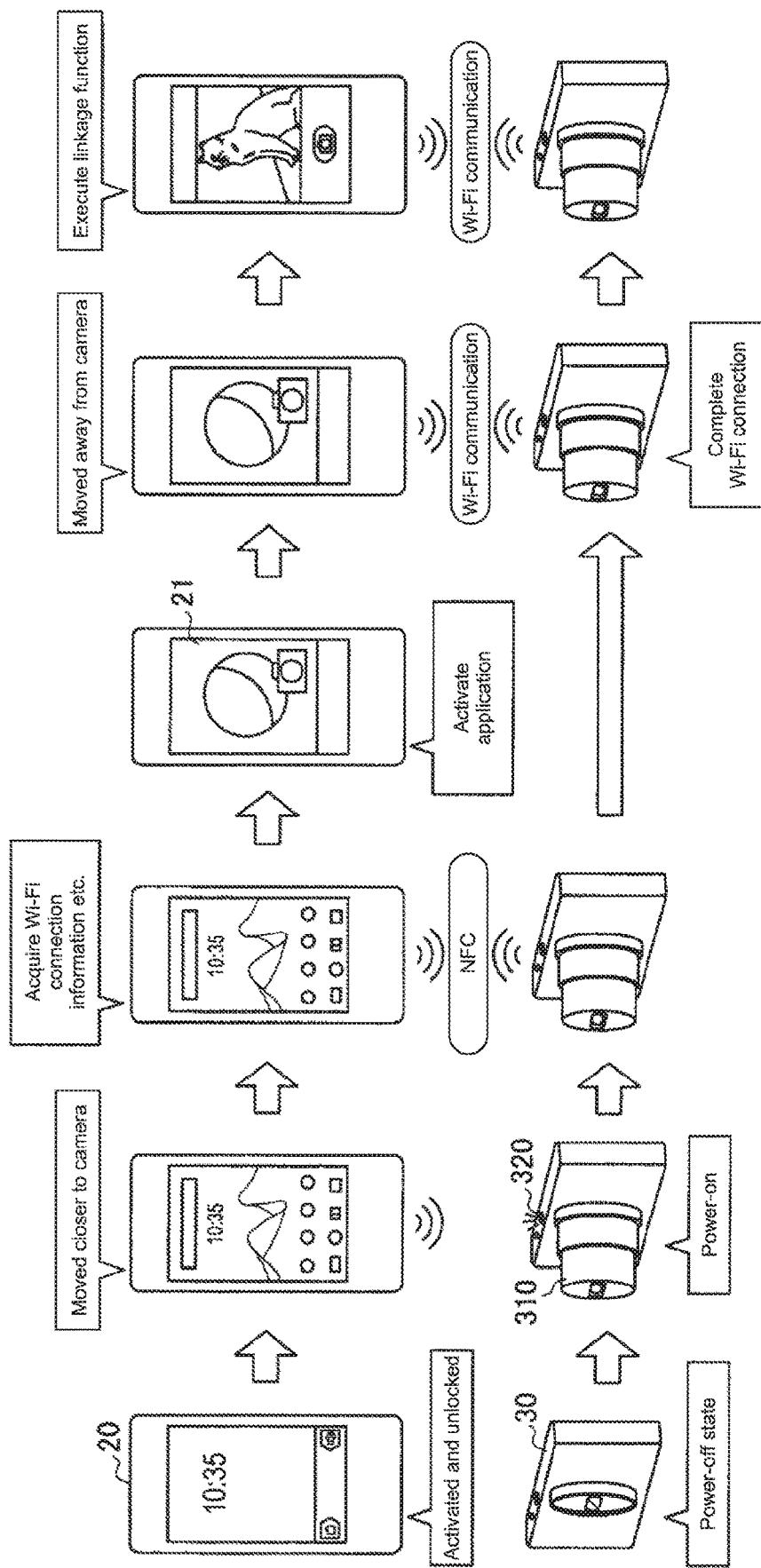
FIG. 2 is a state transition diagram for describing the flow of a series of operations of a digital camera and a communication terminal.

FIG. 2 is a state transition diagram for describing the flow of a series of operations of a digital camera 30 according to a comparative example and the communication terminal 20. As illustrated in FIG. 2, when the communication terminal 20 that is activated and unlocked is moved closer to the digital camera 30 in a power-off state, the digital camera 30 is powered on (power-on) by NFC. In general, at a timing of power-on, an imaging preparation operation such as projecting a collapsible lens 310 or turning a power lamp 320 on is performed in the digital camera 30, as illustrated in FIG. 2.

Next, the communication terminal 20 that is moved closer to the digital camera 30 acquires connection information (information such as ID and PassKey) for performing a wireless communication connection such as Wi-Fi or information of an application to be activated (package name and the like) from the digital camera 30 by NFC.

Next, the communication terminal 20 activates a predetermined application based on the application information acquired from the digital camera 30. An activation screen of the application is displayed on a display part 21.

Subsequently, in the communication terminal 20, when the Wi-Fi communication connection is completed based on the connection information acquired from the digital camera 30, if the communication terminal 20 is moved away from the digital camera 30, the linkage function of the communication terminal 20 and the digital camera 30 is executed by Wi-Fi communication. Examples of the linkage function include a function of remote control for image capture with respect to the digital camera 30 and a function of displaying a through image or a captured image, which is acquired in the digital camera 30, on the communication terminal 20. For example, after placing the digital camera 30 to be directed to a user at a distance and confirming a through image displayed on the display part 21 of the communication terminal 20, the user can tap an image capture button displayed on the display part 21, to remotely issue an instruction to perform image capture.

In such a way, when the user only moves the communication terminal 20 closer to the digital camera 30, a series of operations including the power-on control of the digital camera 30, the activation of an application, the connection establishment of Wi-Fi communication, and the execution of the linkage function are automatically performed.

However, when such a series of operations is performed, if the communication terminal 20 is moved away from the digital camera 30 in the middle of NFC, a problem of a connection failure is caused. Hereinafter, the problem will be described with reference to FIG. 3.

Figure 3:
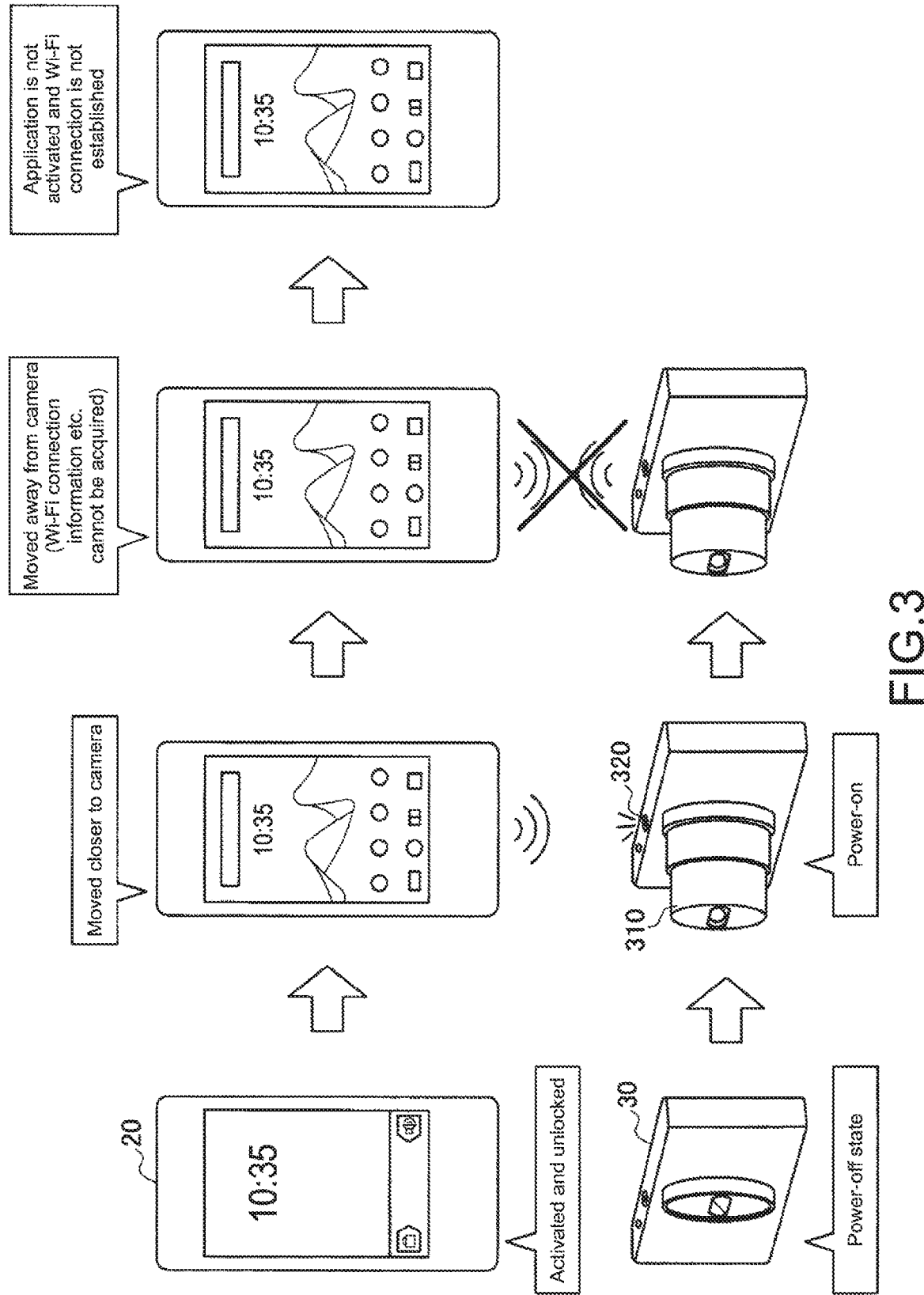
FIG. 3 is a state transition diagram for describing a case where the communication terminal is moved away in the middle of processing.

FIG. 3 is a state transition diagram for describing a case where the communication terminal 20 is moved away from the digital camera 30 in the middle of connection processing. As illustrated in FIG. 3, when the communication terminal 20 is moved closer to the digital camera 30 and the digital camera 30 is powered on, the collapsible lens 310 is projected or the power lamp 320 is turned on, and thus there is a possibility that the user understands that the connection processing has succeeded and then moves the communication terminal 20 away from the digital camera 30. When the communication terminal 20 is moved away from the digital camera 30, NFC cannot be performed. The communication terminal 20 cannot acquire connection information required for the Wi-Fi communication connection or information of an application to be activated.

As a result, the communication terminal 20 cannot activate the application and establish a Wi-Fi connection, and thus cannot execute the linkage function.

In this regard, in view of the circumstances described above, as illustrated in FIG. 1, the digital camera 10 according to the present embodiment performs power-on control in response to NFC when the communication terminal 20 comes close thereto, but does not perform an imaging preparation operation such as projecting a collapsible lens 13 or turning a power lamp 12 on. As illustrated in FIG. 1, after the power-on control is performed and after transmission of the connection information required to establish the Wi-Fi communication connection and the like is completed, the digital camera 10 according to the present embodiment performs the imaging preparation operation such as projecting the collapsible lens 13 or turning the power lamp 12 on. After the transmission of the Wi-Fi connection information and the like is completed, if the communication terminal 20 is moved away from the digital camera 30, the communication terminal 20 can continue to perform the series of operations, because the information required for activation of the application and a Wi-Fi connection is already acquired from the digital camera 30.

Hereinabove, the overview of the digital camera 10 according to an embodiment of the present disclosure has been described. Subsequently, the basic configuration of the digital camera 10 according to the present disclosure will be specifically described with reference to FIG. 4.

«2. Basic Configuration»

Figure 4:
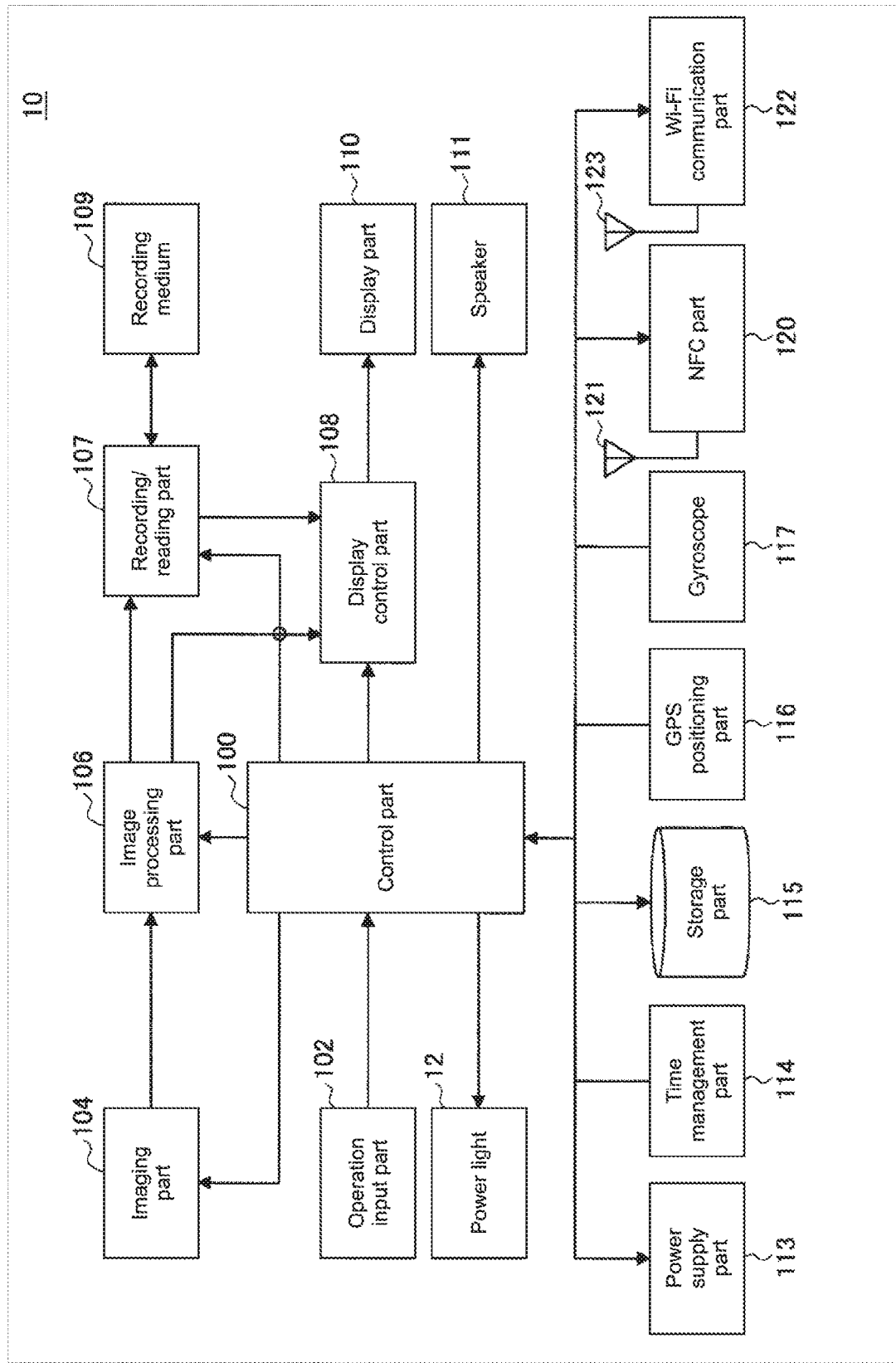
FIG. 4 is a block configuration diagram illustrating an example of a basic configuration of the digital camera according to the present embodiment.

FIG. 4 is a block configuration diagram illustrating an example of a basic configuration of the digital camera 10 according to the present embodiment. As illustrated in FIG. 4, the digital camera 10 includes a control part 100, an operation input part 102, the power lamp 12, an imaging part 104, an image processing part 106, a recording/reading part 107, a recording medium 109, a display part 110, a speaker 111, a power supply part 113, a time management part 114, a storage part 115, a GPS positioning part 116, a gyroscope 117, the NFC part 120, and a Wi-Fi communication part 122.

(Control Part)

The control part 100 controls configurations of the digital camera 10. For example, as illustrated in FIG. 4, the control part 100 outputs control signals, which correspond to an operation signal output from the operation input part 102, to the respective configurations and performs imaging control, image processing control, recording control, display control, and the like. Further, the control part 100 according to the present embodiment also functions as a communication control part that controls the NFC part 120 and the Wi-Fi communication part 122.

Further, the control part 100 according to the present embodiment outputs a power-supply control signal to the power supply part 113 and switches power-on/off of the digital camera 10. Specifically, the control part 100 performs power-on control when detecting, by the NFC part 120, a radio signal in an NFC band that corresponds to a polling command from an external device. After the power is on, the control part 100 then transmits connection information (ID, PassKey, and the like) for performing connection with the external device (for example, the communication terminal 20) by wireless communication (for example, Wi-Fi communication) from the NFC part 120 to the external device. When the transmission of the connection information is completed, the control part 100 performs control such that the imaging preparation operation is performed.

In this specification, the imaging preparation operation represents an operation involving a change in appearance of the digital camera 10 or a notification of activation to the user. Specifically, the imaging preparation operation involving a change in appearance is a drive operation of projecting the collapsible lens 13, for example. Further, the imaging preparation operation involving a notification of activation to the user is an operation of reproducing a start-up sound from the speaker 111 or an operation of emitting light from the power lamp 12, for example. With this operation, the projection of the collapsible lens 13 or the like is not performed before the transmission of the connection information is completed, and thus it is possible to prevent the user from understanding that the connection has succeeded and moving the communication terminal 20 away from the digital camera 10 in the middle of the Wi-Fi connection processing.

Further, the control part 100 performs control such that information for specifying an application to be activated in the external device (for example, package name) is transmitted from the NFC part 120 together with the connection information.

After the control part 100 turns on the digital camera 10 and when the transmission of the connection information is not completed within a predetermined period of time, the control part 100 performs control such that the digital camera 10 is powered off.

Further, when the control part 100 detects not a radio signal corresponding to a polling command from the external device but a press of the power button 15 by the user, the power button 15 being illustrated in FIG. 1, the control part 100 performs control such that the power-on control of the digital camera 10 and the imaging preparation operation are normally performed.

(Operation Input Part)

The operation input part 102 detects an operation input by the user and outputs the operation input as an operation signal to the control part 100. The operation input part 102 may be a button formed by a physical configuration (shutter button 14, power button 15, mode switch, menu button, operating lever, or the like) or may be a touch panel for detecting a touch operation onto an operation screen.

(Imaging Part)

The imaging part 104 is a signal conversion part such as a CCD (Charge Coupled Device) or a CMOS (Complementary Metal Oxide Semiconductor), in which a subject image is formed by an optical system. An imaging lens included in the optical system may be the collapsible lens 13 as illustrated in FIG. 1. When a subject image is formed in the signal conversion part, the subject image is converted into an electrical image signal by the signal conversion part. Further, the image signal (captured image) converted by the imaging part 104 is transmitted to the display part 110 or the recording medium 109 via the image processing part 106 and the like.

(Image Processing Part)

The image processing part 106 processes the image signal (captured image) output from the imaging part 104. The image processing part 106 performs, for example, noise removal, color compensation, or edge detection as necessary. Further, the image processing part 106 outputs the image signal (captured image), which is output from the imaging part 104, to the display control part 108 and/or the recording/reading part 107.

(Display Control Part)

The display control part 108 controls generation of screen to be displayed on the display part 110 or display of the display part 110. For example, the display control part 108 performs generation of a display screen and display control according to the control signal output from the control part 100. Further, the display control part 108 performs control to display the captured image output from the image processing part 106 or a captured image output from the recording/reading part 107 on the display part 110.

(Display Part)

The display part 110 is, for example, a display device such as a liquid crystal display (LCD) device or an OLED (Organic Light Emitting Diode) device.

(Recording/Reading Part)

The recording/reading part 107 records the image signal (captured image) output from the image processing part 106 on the recording medium 109 or reads the captured image recorded on the recording medium 109, according to a timing at which the shutter button 14 is pressed, for example. Further, the recording/reading part 107 may compress the captured image and then record the resultant captured image on the recording medium 109. Further, when compressed data is read from the recording medium 109, the compressed data is combined and then output to the display control part 108.

(Recording Medium)

The recording medium 109 is a memory card in which the captured image is written, or the like.

(Power Supply Part)

The power supply part 113 includes a battery and a power supply circuit and switches power-on/off according to a power-supply control signal output from the control part 100. Further, the power supply part 113 supplies power to the configurations of the digital camera 10.

(Time Management Part)

The time management part 114 is an example of an acquisition part that acquires time information, and more specifically, includes a clock circuit and manages year, month, and day and hour, minute, and second. The time information acquired by the time management part 114 is added to the captured image, as a record of an imaging time of day.

(Storage Part)

The storage part 115 is a recording medium such as a RAM (Random Access Memory) or a ROM (Read Only Memory). The RAM is used as a work area of the control part 100, for example. Further, in the ROM, for example, programs for the control part 100 to perform the above-mentioned power-on/off control, imaging preparation operation control, and communication control, and the like are written.

(GPS Positioning Part)

The GPS (Global Positioning System) positioning part 116 receives radio waves from a GPS satellite and determines a position where the digital camera 10 is present (current position). It should be noted that the GPS positioning part 116 is an example of a position information acquisition part that acquires current position information based on a signal acquired from the outside, and the example of the position information acquisition part is not limited to the GPS positioning part 116. For example, the position information acquisition part may acquire the current position information through Wi-Fi, transmitting and receiving with respect to a mobile phone, a PHS, a smartphone, or the like, or near field communication.

(Gyroscope)

The gyroscope 117 has a function of detecting a velocity (angular velocity) in which a rotation angle about a Z axis changes, or detecting an angular velocity about a Y axis, when the digital camera 10 is turning. Further, the digital camera 10 may include, in addition to the gyroscope 117, a three-axis acceleration sensor having a function of detecting an acceleration along an X axis, an acceleration along the Y axis, and an acceleration along the Z axis as voltage values.

(NFC Part 120)

The NFC part 120 is an interface that cooperates with the NFC antenna 121 to perform contactless communication with an adjacent external device (for example, communication terminal 20) according to the control by the control part 100. The NFC part 120 transmits radio waves that reach a close range of approximately 3 cm to 10 cm, or depending on the design, approximately 7 mm, from the NFC antenna 121, and performs the NFC with an external device included within the radio wave reach range.

For example, the NFC part 120 transmits connection information (Wi-Fi Configuration) for an automatic connection to Wi-Fi and an AAR (Android Application Record) according to a check command from the external device. The Wi-Fi Configuration includes an SSID (Service Set Identifier) for a Wi-Fi connection, a PassKey (encryption key), and the like.

(Wi-Fi Communication Part)

The Wi-Fi communication part 122 is an interface that cooperates with a Wi-Fi antenna 123 to perform wireless communication with a surrounding external device (for example, communication terminal 20) according to the control by the control part 100.

For example, the Wi-Fi communication part 122 performs Wi-Fi authentication in response to a Wi-Fi connection request from the external device and performs processing of establishing a Wi-Fi communication connection with the external device.

Hereinabove, the basic configuration of the digital camera 10 according to the present embodiment has been specifically described. Subsequently, the operation processing of the digital camera 10 according to the present embodiment and the communication terminal 20 will be described with reference to FIGS. 5 to 7.

«3. Operation Processing»

<3-1. Operation Processing of Digital Camera>

Figure 5:
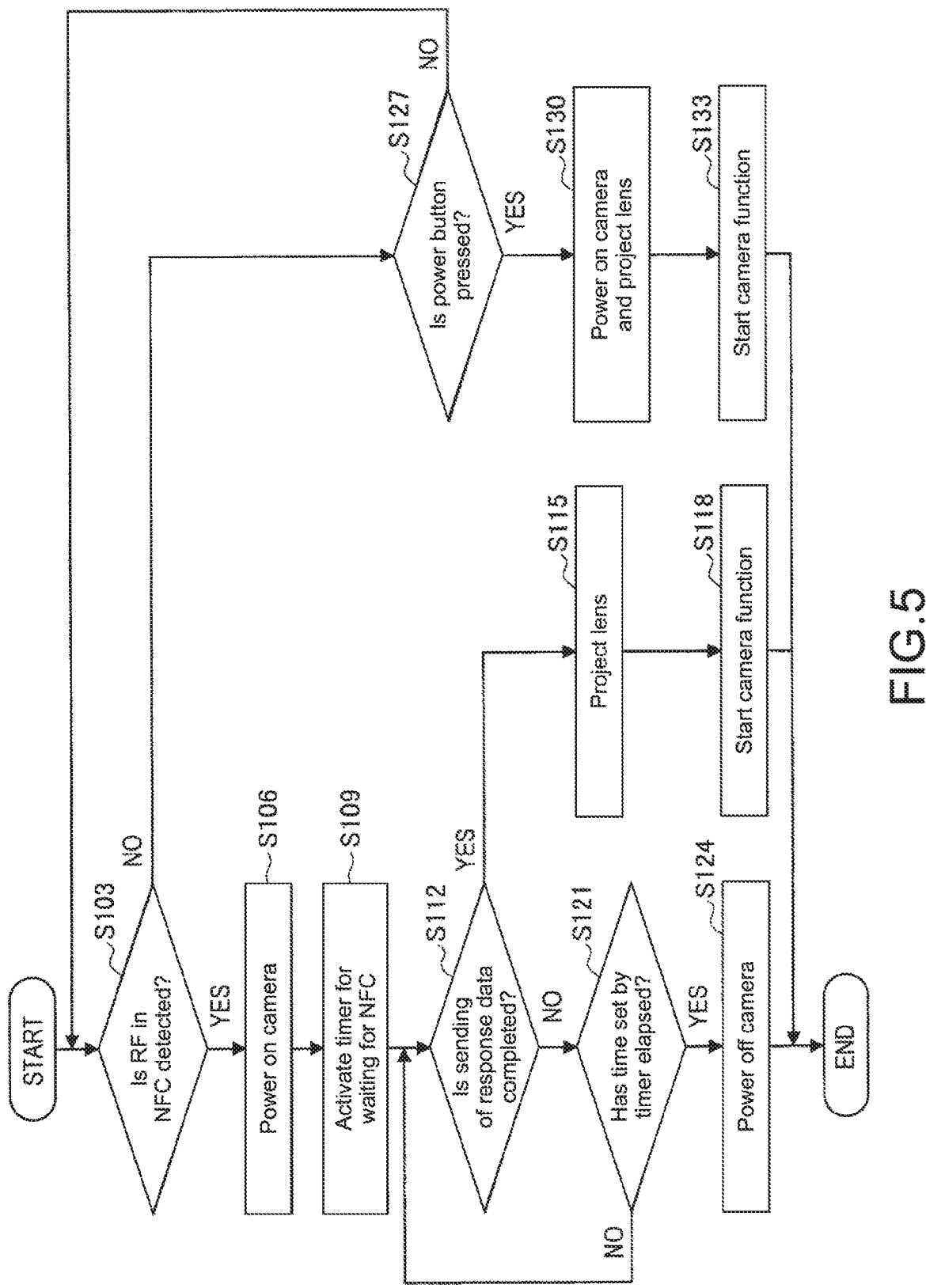
FIG. 5 is a flowchart illustrating operation processing according to the present embodiment.

First, the operation processing of the digital camera 10 according to the present embodiment will be described with reference to FIG. 5. FIG. 5 is a flowchart illustrating the operation processing of the digital camera 10 according to the present embodiment.

As illustrated in FIG. 5, first, in Step S103, the NFC part 120 detects an RF (radio signal) in an NFC band from the outside. Such a radio signal corresponds to a polling command that is transmitted from the communication terminal 20. The radio signal is detected with a frequency detector for a radio signal in the NFC band, the frequency detector being included in the NFC part 120, and thus the command is not decoded at this point of time. The NFC part 120 recognizes that the RF in the NFC band is detected.

Next, when detecting the radio signal in the NFC band (S103/Yes), in Step S106, the control part 100 outputs a power-supply control signal to the power supply part 113 such that the digital camera 10 in the power-off state is powered on. In this case, the control part 100 does not perform an imaging preparation operation such as projecting the collapsible lens 13.

Next, in Step S109, the control part 100 activates a timer for waiting for the NFC by using the time management part 114.

Subsequently, in Step S112, the control part 100 determines whether transmission of response data by the NFC in response to the check command from the outside is completed or not. The response data transmitted by the NFC in response to the check command is the above-mentioned Wi-Fi Config and AAR.

Next, when the transmission of the response data is completed (S112/Yes), in Step S115, the control part 100 performs an imaging preparation operation such as projecting the collapsible lens 13.

Next, in Step S118, the control part 100 starts a camera function. For example, the control part 100 displays a through image on the display part 110. The through image is obtained by converting a subject image that is formed by the optical system including the collapsible lens 13 into an electrical image signal. Further, the control part 100 establishes a Wi-Fi connection with the external device and executes the linkage function with the external device.

On the other hand, when the transmission of the response data is not completed (S112/No) and when a time that is set by the timer (a predetermined period of time) has elapsed (S121/Yes), in Step S124, the control part 100 outputs a power-supply control signal to the power supply part 113 such that the digital camera 10 is powered off. Thus, even if the digital camera 10 reacts to radio waves in the same bandwidth as a polling command, which is transmitted from wireless devices (automatic turnstile, automatic vending machine, automatic authentication gate, etc.) other than a predetermined communication terminal 20 implementing the linkage function, and is powered on due to malfunction, the digital camera 10 can be powered off after a predetermined period of time. Further, it is possible to cut wasteful electric power consumption. Additionally, even if the digital camera 10 is powered on, the imaging preparation operation such as projecting the collapsible lens 13 is not performed. Thus, it is possible to prevent the collapsible lens 13 from being projected within the casing and the lens from being damaged, even if the digital camera 10 reacts to radio waves from wireless devices other than the communication terminal 20 and is powered on.

Figure 6:
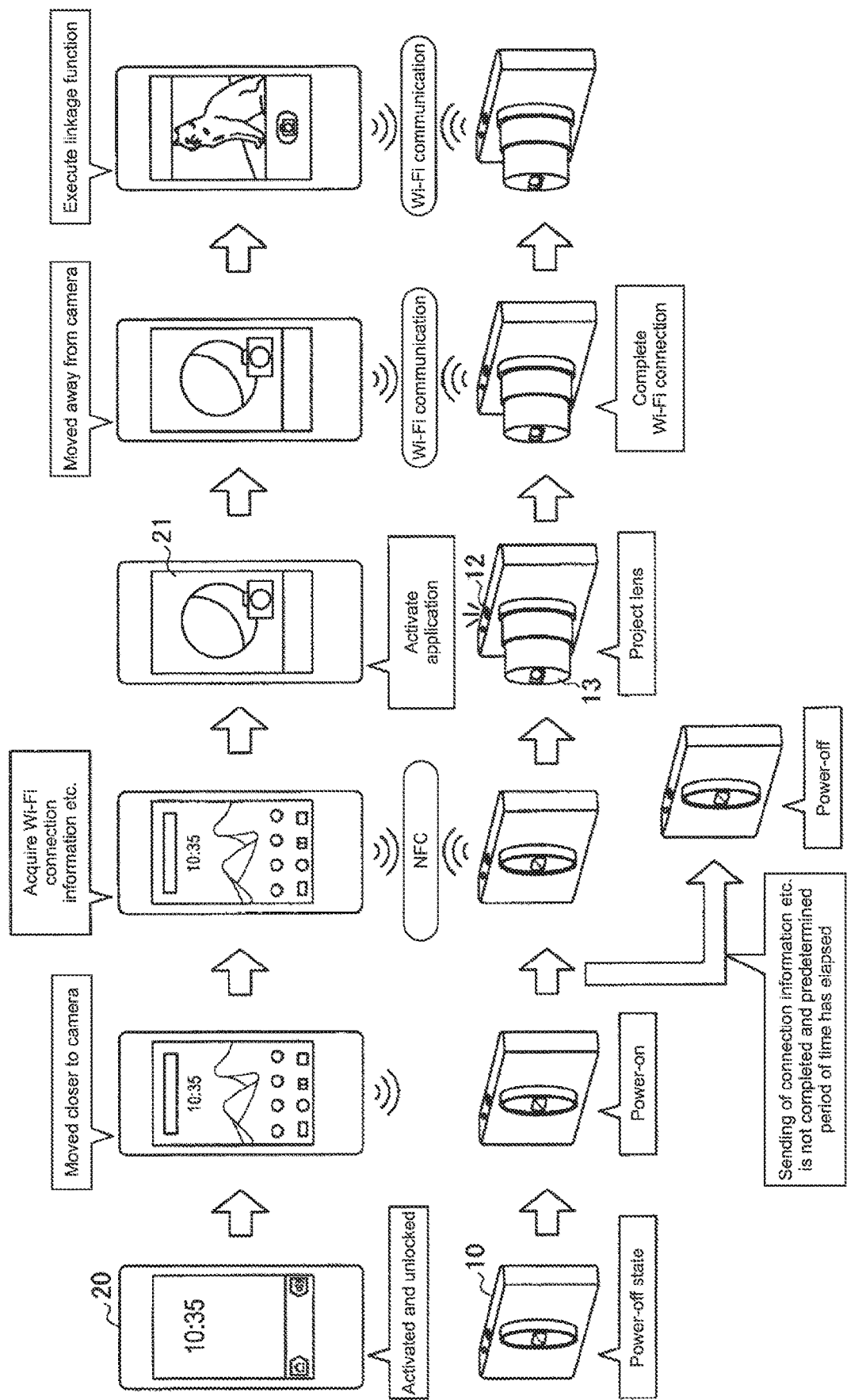
FIG. 6 is a state transition diagram for describing a series of operations according to the present embodiment.

FIG. 6 illustrates a state transition diagram for describing the above-mentioned series of operations of the digital camera 10 in association with the operation of the communication terminal 20. As illustrated in FIG. 6, when the communication terminal 20 comes close to the digital camera 10 in the power-off state, the digital camera 10 is powered on by NFC. At this point of time, however, the imaging preparation operation such as projecting the collapsible lens 13 is not performed. Thus, it is possible to prevent the user from understanding that the connection processing has succeeded and moving the communication terminal 20 away from the digital camera 10 at this point of time.

Next, as illustrated in FIG. 6, the communication terminal 20 receives Wi-Fi connection information and the like (Wi-Fi Config and AAR) from the digital camera 10 by the NFC. When the transmission of the connection information and the like is completed, the digital camera 10 performs the imaging preparation operation such as projecting the collapsible lens 13 or emitting light from the power lamp 12. On the other hand, on the communication terminal 20 side, a predetermined application is activated according to the AAR, and a Wi-Fi connection request is made to the digital camera 10 by using the Wi-Fi Config. When the Wi-Fi connection is completed between the communication terminal 20 and the digital camera 10, the linkage function using the Wi-Fi communication is executed.

In such a manner, since the digital camera 10 according to the present embodiment projects the collapsible lens 13, or the like, after the transmission of the connection information and the like is completed, if the user understands that the connection processing has succeeded and moves the communication terminal 20 away at this point of time, the communication terminal 20 can perform the series of operations to the execution of the linkage function.

It should be noted that when the transmission of the connection information and the like is not completed and a predetermined period of time has elapsed, as illustrated in FIG. 6, the digital camera 10 performs power-off control, and thus it is possible to cut wasteful electric power consumption in the case where the digital camera 10 is activated due to malfunction. Further, even if the digital camera 10 is powered on due to malfunction, the collapsible lens 13 is not projected. Thus, it is possible to prevent the lens from being damaged by the collapsible lens 13 projected in a state of being stored in the casing, when the digital camera 10 is powered on.

Hereinabove, the power-on control by the NFC has been described. It should be noted that as illustrated in FIG. 5, in the case of detecting not a polling command (S103/No) but a press of the power button 15 (S127/Yes), in Step S130, the control part 100 performs power-on normally and the imaging preparation operation such as projecting the collapsible lens 13.

Next, in Step S133, the control part 100 starts a camera function.

<3-2. Operation Processing of Control System>

Figure 7:
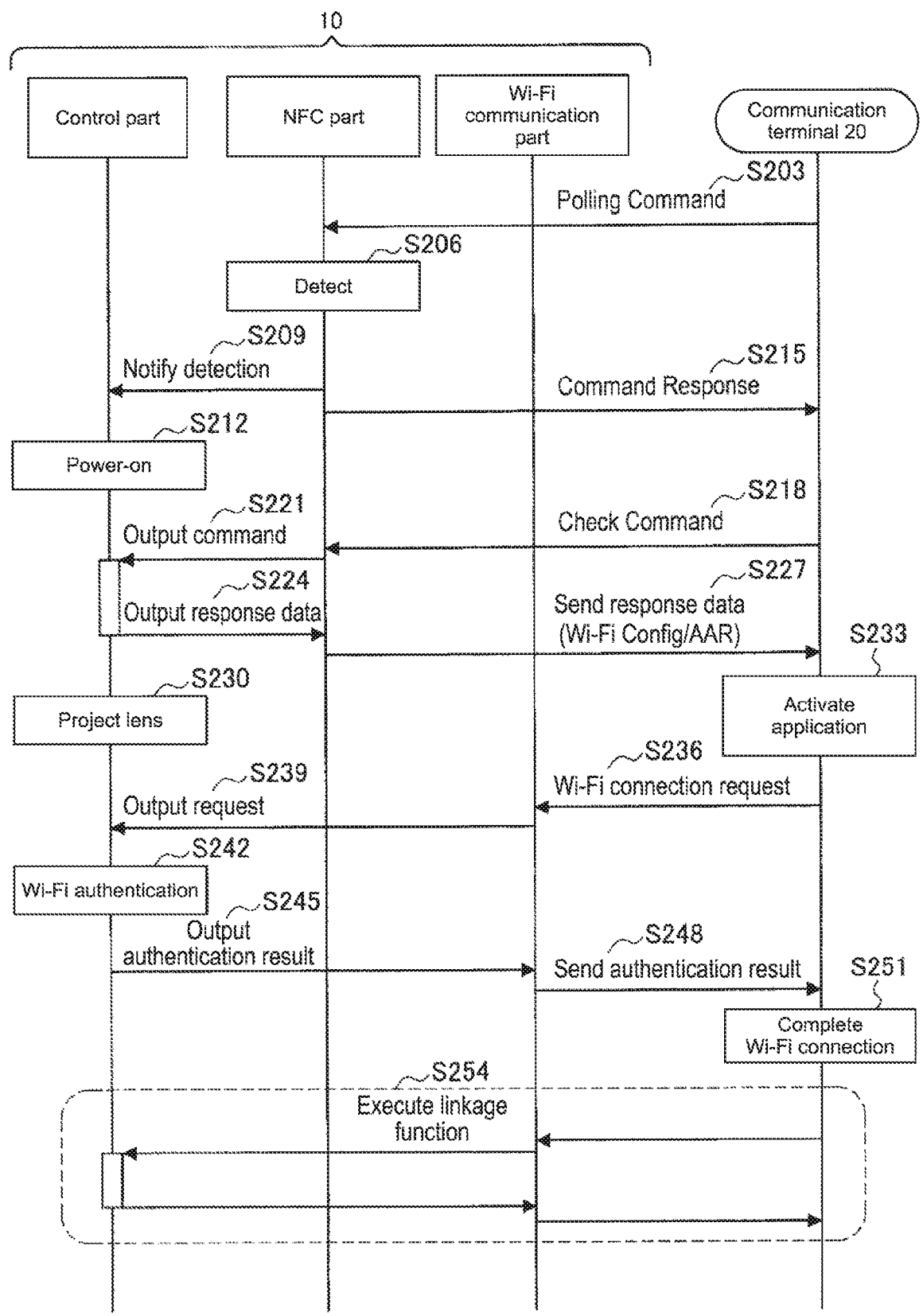
FIG. 7 is a sequence diagram illustrating the operation processing of a control system according to the present embodiment.

Subsequently, the operation processing of a control system formed by the digital camera 10 according to the present embodiment and the communication terminal 20 will be described with reference to FIG. 7. FIG. 7 is a sequence diagram illustrating the operation processing of the control system according to the present embodiment.

As illustrated in FIG. 7, first, in Step S203, the communication terminal 20 transmits a polling command by NFC.

Next, in Step S206, when the NFC antenna 121 of the digital camera 10 is included within a predetermined radio wave reach range (for example, approximately 7 mm) from the NFC antenna of the communication terminal 20, the NFC part 120 detects the polling command. It should be noted that the NFC part 120 detects the command with a frequency detector for a radio signal in the NFC band, as described above, and thus the NFC part 120 cannot recognize what command the detected radio signal represents, and recognizes that the RF in the NFC band is detected.

Next, in Step S209, the NFC part 120 is driven in response to the detection of the RF in the NFC band and notifies the control part 100 of the detection.

Next, in Step S212, the control part 100 outputs a power-supply control signal to the power supply part 113 in response to the notification of the detection by the NFC part 120 and performs the power-on control.

Next, in Step S215, the NFC part 120 transmits a command response by the NFC, in response to the detection of the RF in the NFC band.

Subsequently, in Step S218, the communication terminal 20 detects the command response from the digital camera 10 and thus finds the other party of the NFC, and then transmits a check command in order to acquire predetermined information.

Next, in Step S221, the NFC part 120 of the digital camera 10 outputs the check command, which is received by the NFC, to the control part 100.

Next, in Step S224, the control part 100 outputs response data to the NFC part 120 in response to the check command. Here, the response data includes the Wi-Fi Config and the AAR.

Next, in Step S227, the NFC part 120 transmits the response data to the communication terminal 20 by the NFC.

It should be noted that S218 to S227 described above may be performed a plurality of times and the response data may be transmitted in a plurality of times.

Subsequently, in Step S233, the communication terminal 20 activates a predetermined application according to the received AAR.

Next, in Step S236, the communication terminal 20 makes a Wi-Fi connection request to the digital camera 10 by using the received Wi-Fi Config.

Next, in Step S239, the Wi-Fi communication part 122 of the digital camera Outputs the connection request, which is received from the communication terminal 20, to the control part 100.

Next, in Step S242, the control part 100 performs Wi-Fi authentication. It should be noted that the Wi-Fi authentication may be performed by the Wi-Fi communication part 122.

Next, in Step S245, the control part 100 outputs an authentication result to the Wi-Fi communication part 122.

Subsequently, in Step S248, the Wi-Fi communication part 122 transmits the authentication result to the communication terminal 20.

In Step S251, when the authentication succeeds, the Wi-Fi connection is completed.

After that, in Step S254, the linkage function using the Wi-Fi communication is executed between the communication terminal 20 and the digital camera 10.

«4. Other Embodiments»

The above embodiment has described the digital camera 10 used separately from the communication terminal 20, as an example. As another embodiment, an example of an imaging unit 1 including a digital camera that can be used by being installed to the communication terminal 20 will be described.

It should be noted that in the following description, directions viewed from a photographer in an image capture operation are set to front and rear, up and down, and right and left directions. Therefore, a subject side is a front side, and the photographer side is a rear side.

Further, the front and rear, up and down, and right and left directions described below are for convenience of description, and the execution of the present technology is not limited to those directions.

Figure 8:
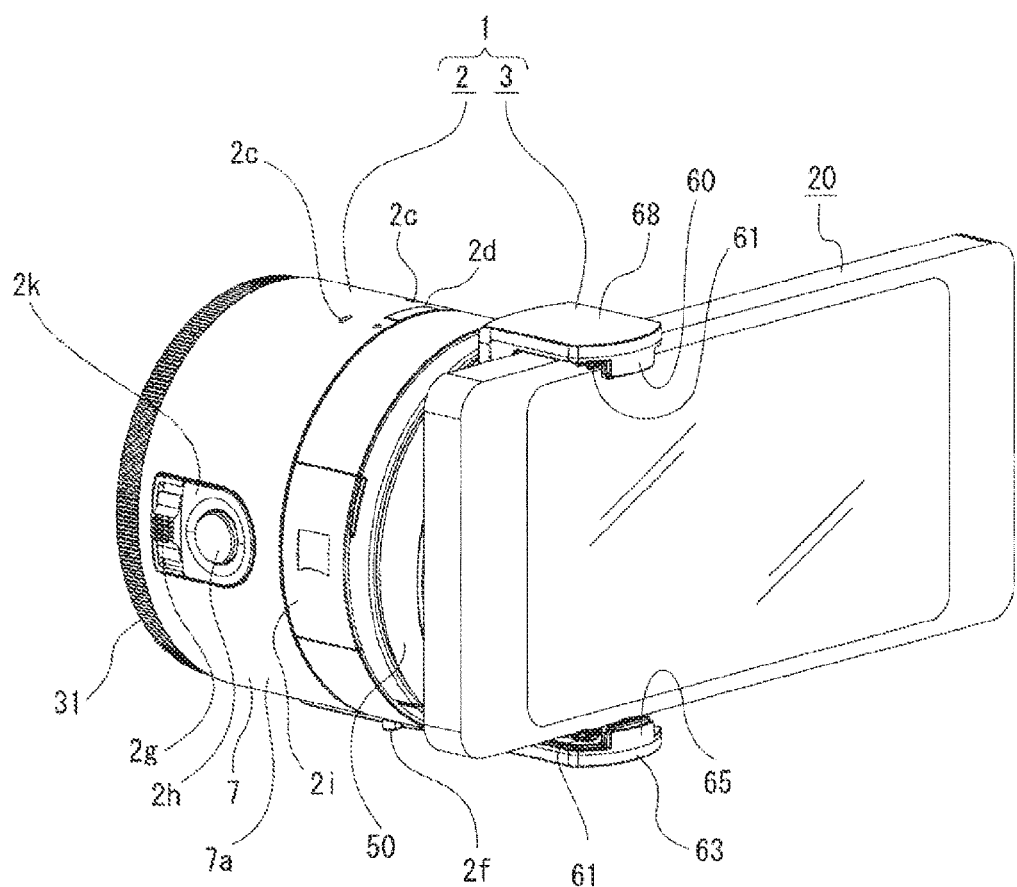
FIG. 8 is a perspective view of an imaging unit serving as an example of a digital camera according to another embodiment, in a state of being installed to a communication terminal.
Figure 9:
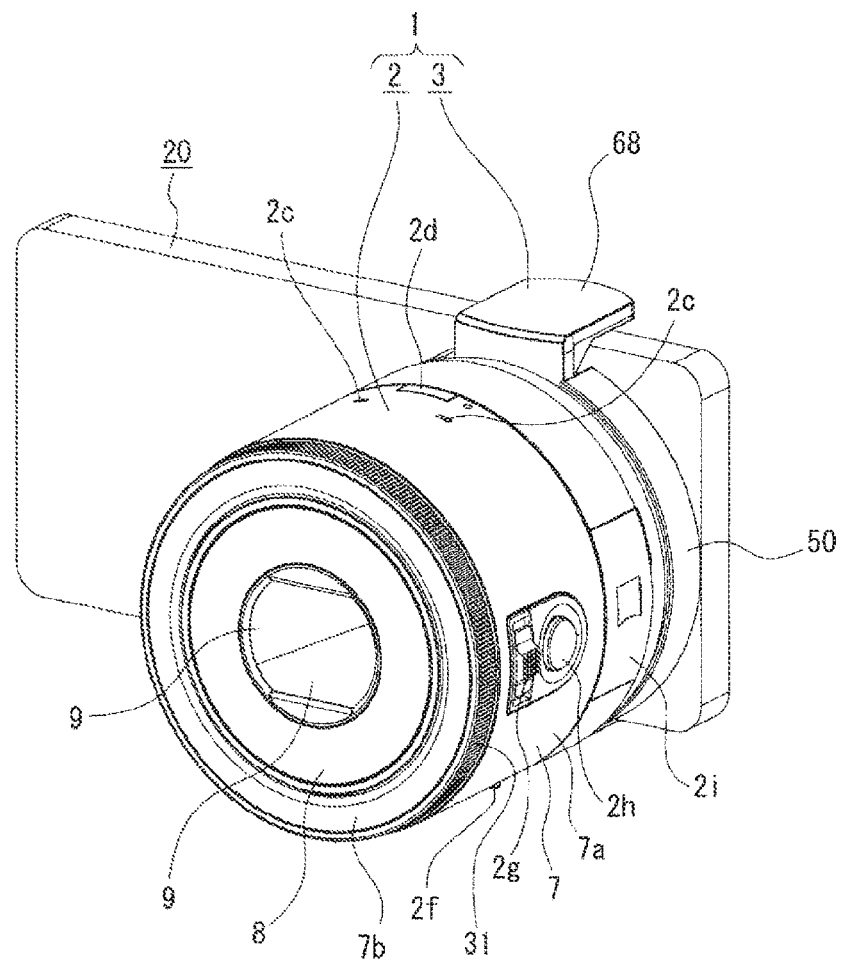
FIG. 9 is a perspective view of the imaging unit according to another embodiment, in a state of being installed to the communication terminal.
Figure 10:
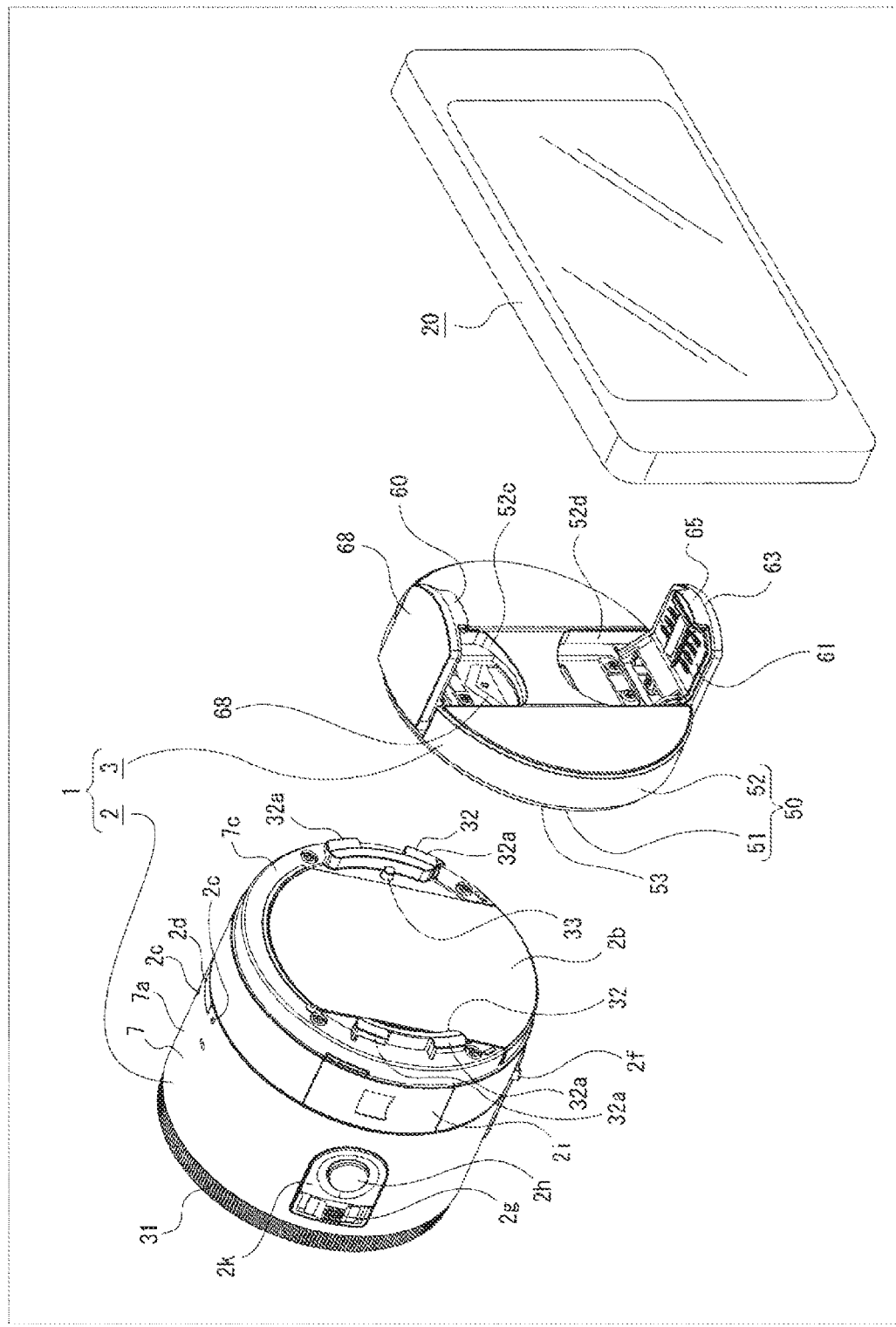
FIG. 10 is a perspective view of the imaging device, an adaptor, and the communication terminal according to another embodiment.
Figure 11:
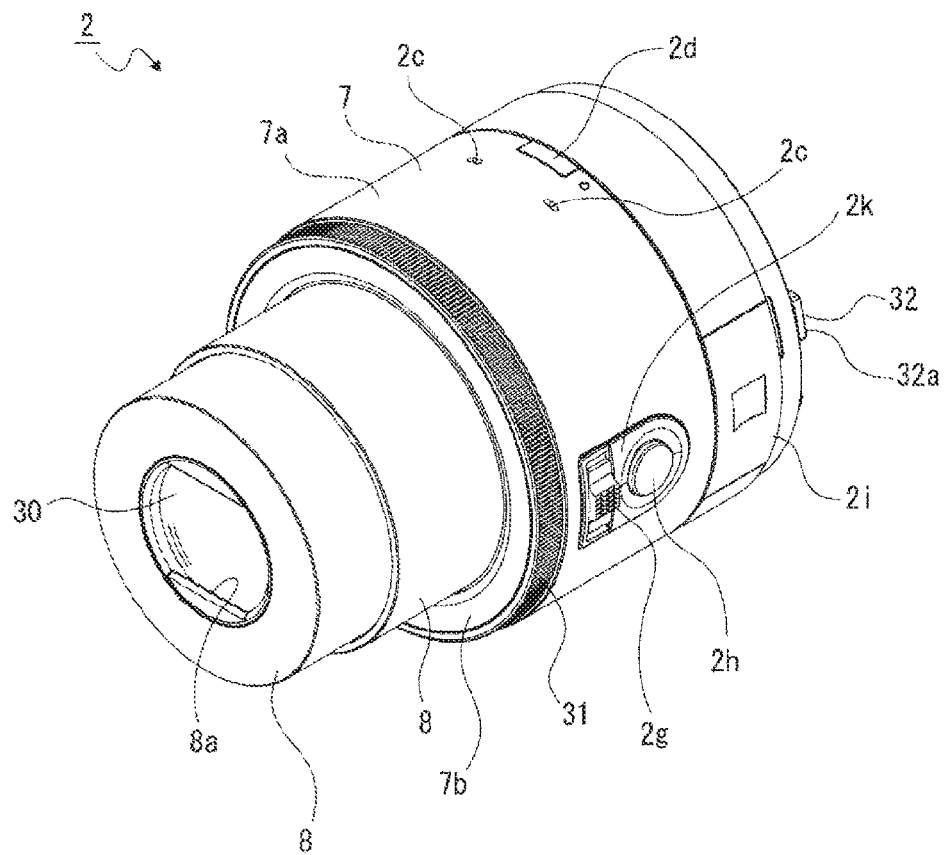
FIG. 11 is a perspective view of the imaging device according to another embodiment, in a state in which inner barrels protrude.
Figure 16:
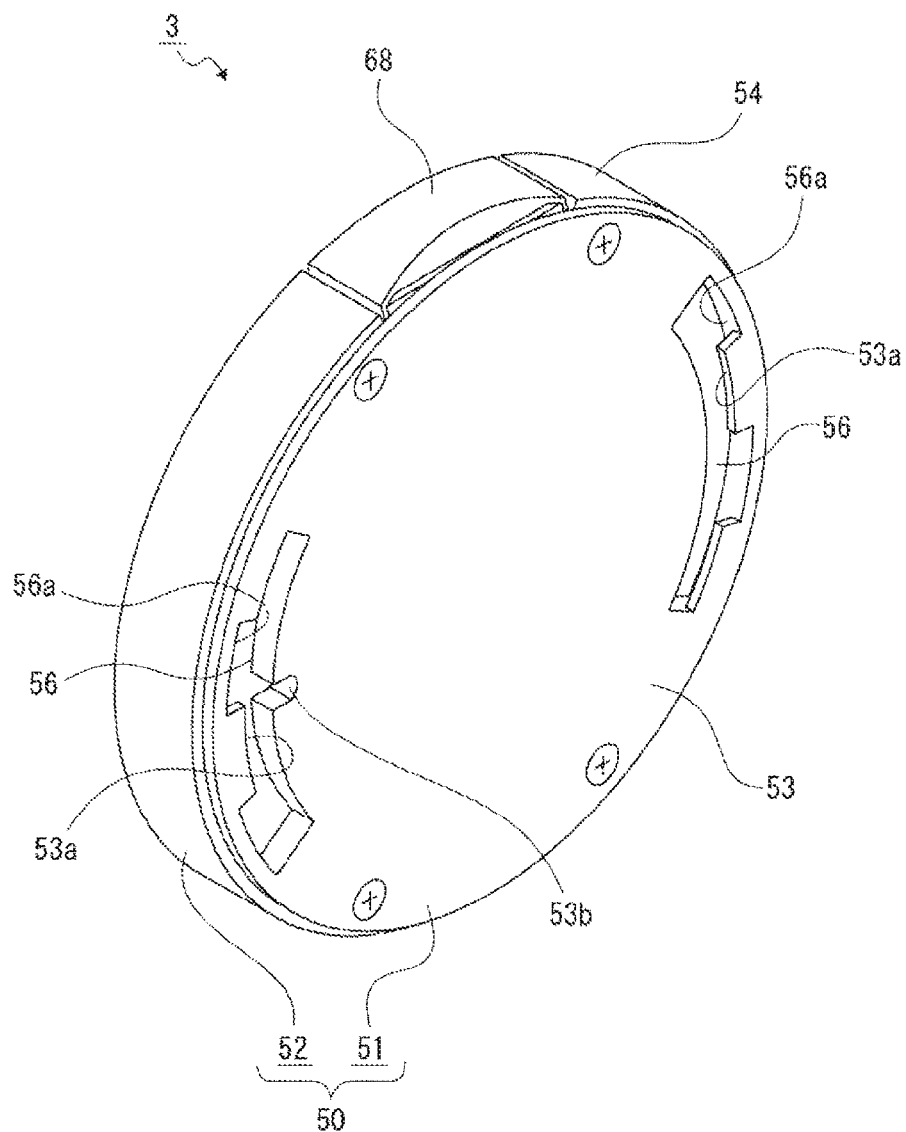
FIG. 16 is a perspective view of an adaptor according to another embodiment.
Figure 17:
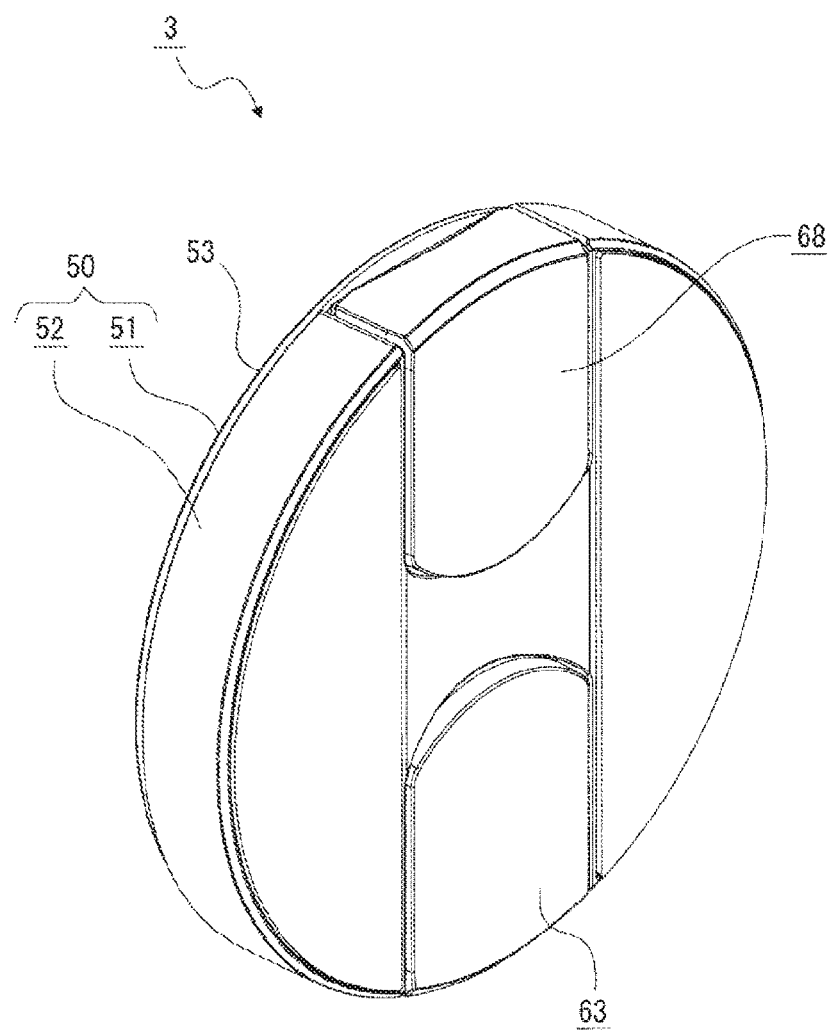
FIG. 17 is a perspective view of the adaptor according to another embodiment.

FIGS. 8 and 9 each illustrate a state in which the imaging unit 1 is installed to the communication terminal 20. FIG. 10 is a perspective view illustrating a digital camera 2, an adaptor 3, and the communication terminal 20 that form the imaging unit 1. Further, FIG. 11 is a perspective view of the digital camera 2 in an activated state. FIGS. 12 to 16 are a plan view, a bottom view, a left side view, and a right side view of the digital camera 2. FIGS. 16 and 17 are each a perspective view of the adaptor 3. Hereinafter, the imaging unit 1 will be described with reference to those figures.

The imaging unit 1 includes the digital camera 2 and the adaptor 3 (see FIGS. 8 to 10). The adaptor 3 is attachable to and detachable from a rear surface of the digital camera 2. However, the imaging unit 1 may have an integrated configuration in which the adaptor 3 is integrally formed with the digital camera 2 at a rear end of the digital camera 2. The digital camera 2 has a communication function capable of transmitting and receiving image data or the like to and from the communication terminal 20.

The adaptor 3 is attachable to and detachable from the communication terminal 20.

The digital camera 2 includes an outer barrel 7, a plurality of lens groups disposed inside the outer barrel 7, and an imaging element (not illustrated) located on the rear side of the lens groups (see FIGS. 8 to 11). In the digital camera 2, light incorporated via the lens groups is subjected to photoelectric conversion in the imaging element. Therefore, the digital camera 2 can capture image or video.

The outer barrel 7 includes a circumferential surface part 7a that is formed in a substantially cylindrical shape extending from the front side to the rear side, an overhang part 7b that overhangs inward from a front end of the circumferential surface part 7a, and a rear surface part 7c that closes the circumferential surface part 7a from the rear side.

Inner barrels 8 and 8 that can be moved in the front and rear direction are supported inside the outer barrel 7. Therefore, the digital camera 2 is turned to an image capture state (see FIG. 11) when the inner barrels 8 and 8 protrude forward with respect to the outer barrel 7, and is turned to a collapsible state (see FIG. 9) when the inner barrels 8 and 8 that have protruded forward are withdrawn backward and are stored in the outer barrel 7.

A light passing hole 8a with a substantially rectangular shape is formed in a front surface part of the inner barrel 8 that is located on the innermost side (see FIG. 11). Lens barriers 9 and 9 are supported on a rear surface side of the front surface part of the inner barrel 8 that is located on the innermost side, so as to be freely opened and closed. The lens barriers 9 and 9 are closed in a collapsible state and are opened in an image capture state by an opening and closing mechanism (not illustrated). Therefore, in the collapsible state, the light passing hole 8a of the inner barrel 8 is closed by the lens barriers 9 and 9 (see FIG. 9) and, in the image capture state, the light passing hole 8a is opened by the lens barriers 9 and 9 (see FIG. 11).

A plurality of lens groups including an image capture lens 30 (see FIG. 11) located on the frontmost side are disposed separately from each other in the optical axis direction inside the digital camera 2, and if the light passing hole 8a is opened by the lens barriers 9 and 9, light is incident to the image capture lens 30 from the outside.

An operation ring 31 is rotatably supported at the front end of the outer barrel 7 (see FIG. 9). When the operation ring 31 is operated, manual focusing or zooming are performed and the lens groups are moved in the optical axis direction.

The operation ring 31 is provided around the outer barrel 7 at the front end of the outer barrel 7, and thus a user easily performs a rotation operation of the operation ring 31. The surface of the operation ring 31 is formed as a sawtooth grip part, which is also suitable to improve the operability of a rotation operation.

It should be noted that the operation ring 31 can switch operation content between a manual focusing operation and a zooming operation on the basis of the control by wireless communication, in response to a user's operation from the communication terminal 20. Therefore, the operation ring 31 can be used as an operation part of a focusing operation and a zooming operation in accordance with a user's preference or circumstances.

Coupling parts 32 and 32 that protrude backward are provided at positions opposite to each other, 180° apart on an outer circumference of the rear surface part 7c of the outer barrel 7 (see FIGS. 10 and 12 to 15). Locking protrusions 32a and 32a that protrude outward separately in a circumferential direction are respectively provided at the coupling parts 32. This forms an engagement structure engaged with coupling recess parts 56a and 56a and locking pieces 53a and 53a of the adaptor 3 to be described later.

A lock pin 33 is supported movably in the front and rear direction in the vicinity of the coupling part 32 of the rear surface part 7c, and the lock pin 33 is biased backward by a spring (not illustrated).

Figure 15:
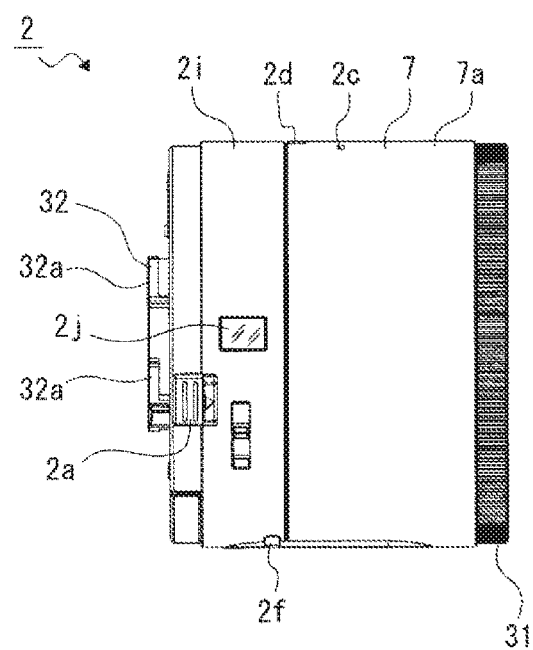
FIG. 15 is a right side view of the imaging device.

An unlock lever 2a is disposed at the rear end of the circumferential surface part 7a of the outer barrel 7 (see FIG. 15). The unlock lever 2a is operated, and thus the lock pin 33 is drawn into the outer barrel 7.

A battery lid 2b is disposed at a portion between the coupling parts 32 and 32 of the rear surface part 7c of the outer barrel 7 (see FIG. 10). A battery loading portion in which a battery is stored is formed inside the battery lid 2h in the digital camera 2. The battery lid 2b is opened and closed, and thus a battery (not illustrated) can be installed in and removed from the storage portion.

Here, the coupling parts 32 and 32 are formed on the outer circumference of the rear surface part 7c, and thus a gap between the coupling parts 32 and 32 can be used for disposing the battery lid 2b and the battery loading portion. In other words, the coupling parts 32 and 32 are formed on the outer circumference of the rear surface part 7c, which does not impede ensuring of a space for storing the battery.

Figure 12:
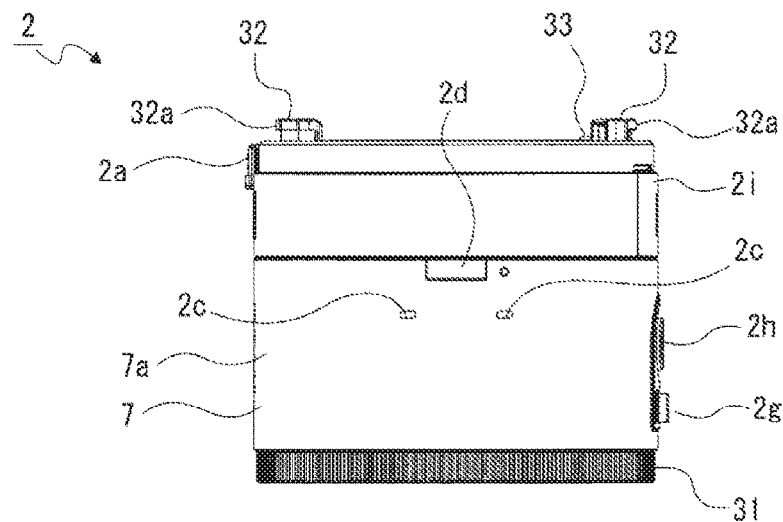
FIG. 12 is a plan view of the imaging device.

Microphones 2c and 2c and a power button 2d are disposed separately from each other in the front and rear direction at the upper end of the circumferential surface part 7a of the outer barrel 7 (see FIGS. 9, 10, and 12). The microphones 2c and 2c are parts for inputting external sound. As in the present embodiment, in the mode in which the outer barrel 7 serving as a lens casing is a main body of the device, out of positions in which microphones are easily disposed, a position in which external sound are least likely to be interrupted is the circumferential surface part 7a of the outer barrel 7. Therefore, it is suitable to collect external sound by disposing the microphones 2c and 2c in the circumferential surface part 7a. Additionally, since the microphones 2c and 2c are provided at the upper end of the circumferential surface part 7a, the microphones 2c and 2c are hardly blocked when a user grasps the outer barrel 7, and thus are suitable for the input of external sound.

It should be noted that the illustrated portions of the microphones 2c and 2c are visually recognized as microphone holes from the outside. The microphones 2c and 2c are disposed inward of the circumferential surface part 7a, but the microphone holes (2c, 2c) that guide external sound to the two microphones that input at least external sound are formed on the circumferential surface part 7a at bilaterally symmetric positions. Being bilaterally symmetric is suitable to collect stereophonic sound on the right and left sides.

The power button 2d is disposed such that the surface thereof does not protrude from a surface forming the circumferential surface part 7a. For example, as illustrated in the figure, the power button 2d is formed to be flush with the circumferential surface part 7a. Alternatively, the surface of the power button 2d may be lowered below the circumferential surface part 7a.

The power button 2d does not protrude from the circumferential surface part 7a, and thus it is suitable to prevent an erroneous operation of the power button 2d.

When the power button 2d is operated, power is supplied or stops being supplied in the digital camera 2. When power is supplied, the inner barrels 8 and 8 protrude forward with respect to the outer barrel 7, thereby setting an image capture state, and when power stops being supplied, the inner barrels 8 and 8 that have protruded forward are withdrawn backward and are stored in the outer barrel 7, thereby setting a collapsible state.

Figure 13:
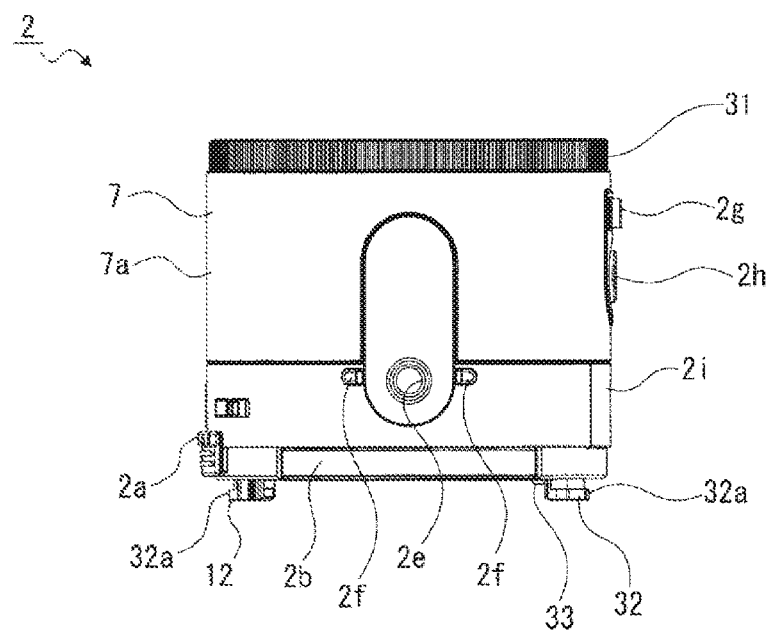
FIG. 13 is a bottom view of the imaging device.

A tripod hole 2e is formed at the lower end of the circumferential surface part 7a of the outer barrel 7 (see FIG. 13). The tripod hole 2e is a hole for coupling the digital camera 2 to a tripod (not illustrated) when an image capture operation is performed, for example. As in the present embodiment, in the case where the outer barrel 7 has a shape forming the main body of the digital camera 2, the tripod hole 2e is formed at the lower end of the circumferential surface part 7a, and thus a balance when the tripod is attached can be achieved.

Rolling prevention protrusions 2f and 2f are provided on the right and left sides of the tripod hole 2e at the lower end of the circumferential surface part 7a of the outer barrel 7 (see FIGS. 10 and 13). The rolling prevention protrusions 2f and 2f protrude slightly downward. The digital camera 2 is prevented from rolling by the rolling prevention protrusions 2f and 2f when the digital camera 2 is placed on a desk, a table, or the like, and thus it is possible to prevent damage or a failure by the digital camera 2 falling off.

As in the present embodiment, in the case of a device in which the entire circumferential surface part 7a or at least a part thereof is a curved surface, and such a circumferential surface part 7a forms an outer casing, the rolling prevention protrusions 2f are useful.

Figure 14:
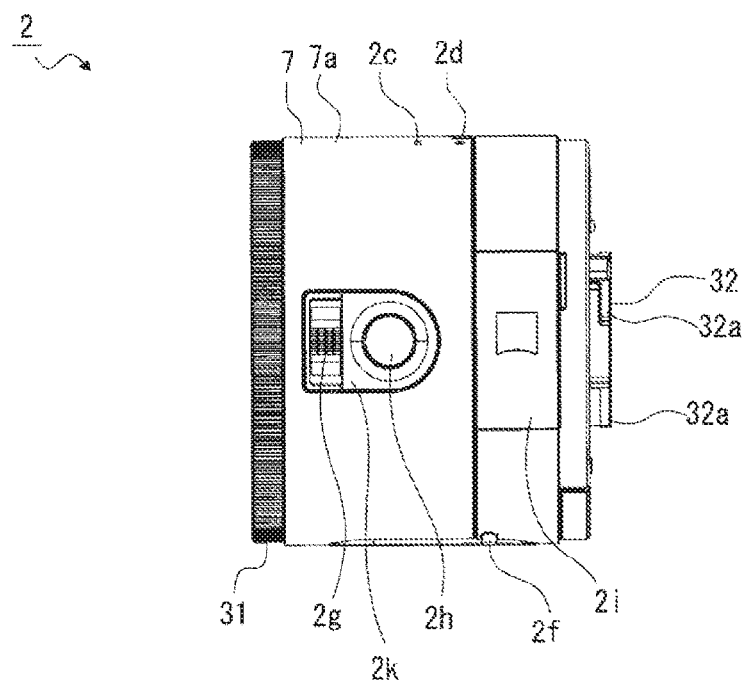
FIG. 14 is a left side view of the imaging device.

A zoom switch 2g and a shutter button (image capture button) 2h are arranged close to each other in the front and rear direction at the left end of the circumferential surface part 7a of the outer barrel 7 (see FIGS. 10 and 14). When the zoom switch 2g is operated, zooming is performed between telephoto and a wide angle. When the shutter button 2h is operated, an image of a subject is captured. When the zoom switch 2g and the shutter button 2h are disposed close to each other, the user easily performs the series of operations of adjusting the angle of view by zooming and performing a shutter operation. It should be noted that the zoom switch 2g and the shutter button 2h may be arranged not only in the front and rear direction but also in positions close to each other in a state of being arranged in the up and down or oblique direction.

The shutter button 2h and the zoom switch 2g are disposed on the same member 2k. The member 2k forms a part of the circumferential surface part 7a together with the outer barrel 7. With a structure in which the zoom switch 2g and the shutter button 2h disposed close to each other are attached to the member 2k, and the member 2k is attached to the outer barrel 7, the assembly when the imaging device is manufactured can be made more efficient.

It should be noted that the shutter button 2h may be, for example, an operation part for automatic focusing in a half depressing operation, and for imaging or photographing a subject in a full depressing operation. For example, assuming that the digital camera 2 is used singly, there is no display part (that is, communication terminal 20), and thus a focusing operation is difficult to perform. If automatic focusing is performed by half depressing of the shutter button 2h, it is possible to provide an operation that is intuitively easily understandable to a user. In addition, if a sound output part is provided so as to output an electronic sound or the like during the automatic focusing operation, this is suitable for a user to recognize the operation.

Further, the zoom switch 2g is formed in the shape of a zoom lever as illustrated in the figures. The zooming operation is performed by operating the lever, and thus the operability is improved. It should be noted that the zoom switch 2g may be formed in the shape of a press button such as wide button/telephoto button. Further, two zoom switches formed in the shape of a button and a lever may be provided.

Since the zoom switch 2g and the shutter button 2h are disposed at the left end of the circumferential surface part 7a, an operating finger is naturally disposed around the zoom switch 2g and the shutter button 2h when the digital camera 2 is grasped from the lower side during an image capture operation, and thus it is possible to improve the convenience for a user in using the digital camera 2 through the improvement of operability.

In addition, the zoom switch 2g and the shutter button 2h are disposed at the left end of the circumferential surface part 7a, and are thus located so as to be separated from the microphones 2c and 2c provided at the upper end of the circumferential surface part 7a. Accordingly, sound emitted when a user operates the shutter button 2h or the zoom switch 2g are not picked up as much as possible by the microphones 2c and 2c.

Further, in relation to the zooming operation, the zoom switch 2g and the above-mentioned operation ring 31 are prepared. Accordingly, a user can select a zooming operation method in accordance with circumstances or a preference, and thus the operability is improved.

Further, since the shutter button 2h and the power button 2d are disposed in positions different in a circumferential direction on the circumferential surface part 7a to be separated from each other on the upper portion and the side portion of the circumferential surface part, it is easy to prevent an error in the power supply operation and the image capture operation. It should be noted that the shutter button 2h and the power button 2d may be separated from each other on the right side and the left side of the circumferential surface part 7a. However, considering that the upper portion of the circumferential surface part 7a is more adequate to the power button 2d as described above, it is adequate to dispose the shutter button 2h on the side portion (right side or left side) of the circumferential surface part.

A cover body 2i is disposed on the rear side of the shutter button 2h at the left end of the circumferential surface part 7a of the outer barrel 7. In the digital camera 2, an external connection terminal such as a USE (Universal Serial Bus) and a memory card slot (hot illustrated) are provided inside the cover body 2i. Therefore, the cover body 2i is opened, and thus connection to an external device and installation of a memory card can be performed. Further, through the connection to an external device or the installation of a memory card, an image or a video captured by the digital camera 2 can be recorded in the external device or the memory card.

A display part 2j formed by a liquid crystal panel or the like is disposed at the right end of the circumferential surface part 7a of the outer barrel 7 (see FIG. 15). The display part 2j displays a residual quantity of a battery or whether or not a memory card is inserted into the memory card slot. The display part 2j is not used for displaying a captured image.

Since the display part 2j is disposed, it is possible to check a residual quantity of a battery or whether or not a memory card is inserted into the memory card slot, from the outside of the digital camera 2, and to thus improve the convenience for a user in using the digital camera 2.

The digital camera 2 has a wireless communication function. By using wireless communication, for example, it is possible to perform various operations such as displaying or preserving an image or a video captured by the digital camera 2 on the communication terminal 20, executing an image capture function of the digital camera 2 by operating the communication terminal 20, and executing the zooming function of the digital camera 2 by operating the communication terminal 20.

For example, specifically, an NFC part (NFC tag) is mounted in the inside close to the upper end of the circumferential surface part 7a in the outer barrel 7, and performs contactless communication with an NFC part mounted in the communication terminal 20. Further, for example, a WIFI communication part is provided for transmission of a captured image or the like, and performs wireless communication with a WIFI communication part mounted in the communication terminal 20.

The digital camera 2 may not only be powered on by operating the power button 2d as described above, but also be powered on through the NFC from the communication terminal 20 side. For example, if the NFC is established, the digital camera 2 is powered on. For example, when the NFC function is displayed in the vicinity of the power button 2d, such as the upper end of the circumferential surface part 7a, a user can easily understand a power-on operation.

Further, when the NFC part is disposed on the upper side in the outer barrel 7, in a case where the digital camera 2 is used by attaching a tripod to the above-described tripod hole 2e, the NFC part becomes as close to the communication terminal 20 as possible easily, which is thus advantageous in contactless communication.

Further, considering a state in which the digital camera 2 is placed on a mounting surface such as a desk, the user generally moves the communication terminal 20 close to the digital camera 2 from above. Therefore, when the NFC part is disposed on the upper side in the outer barrel 7, this arrangement is suitable for near field wireless communication in such a usage mode as well.

It should be noted that another example is also conceivable, in which the position at which the NFC part is disposed in the digital camera 2 is not the upper side in the outer barrel 7. It is desirable not to dispose the NFC part on at least the rear surface side of the outer barrel 7, that is, in a position close to the rear surface part 7c side. If the NFC part that performs near field wireless communication is disposed on the rear surface side, when the digital camera 2 is attached to the communication terminal 20 through the adaptor 3 as illustrated in FIGS. 8 and 9, the NFC part is constantly close to the NFC part on the communication terminal 20 side and may constantly perform polling. Therefore, the NFC part is desirably disposed in a position other than the rear surface side of the outer barrel 7.

The adaptor 3 includes respective necessary parts disposed inside and outside a casing 50 (see FIGS. 16 and 17).

The casing 50 is formed by coupling a base body 51 located on the front side to a cover body 52 located on the rear side.

The base body 51 includes a base surface part 53 that is formed in a disc shape, and projections 56 and 56 that protrude backward from the base surface part 53 (see FIG. 23).

The projections 56 and 56 are formed in shapes that protrude from positions opposite to each other, 180° apart on the outer circumference of the base surface part 53 and that extend in the circumferential direction at both of right and left ends of the base surface part 53. The projection 56 is opened forward, and an inner space of the projection 56 is formed as the coupling recess part 56a (see FIG. 16).

Each of the locking pieces 53a and 53a, . . . that covers a portion of the coupling recess part 56a from the front side is provided on the outer circumference of the base surface part 53. A locked hole 53b that communicates with the coupling recess part 56a is formed in the base surface part 53.

The cover body 52 has exteriors that are formed in a circular shape except for a portion thereof.

A storage recess part 52c that is opened backward and upward and a storage recess part 52d that is opened backward and downward are formed therein (see FIG. 10).

The adaptor 3 is provided with a first attached body 68 and a second attached body 63 to be installed to the communication terminal 20.

The first attached body 68 is stored in the storage recess part 52c and can take a storage position (see FIG. 17) of being closed for the base body 51. Further, the first attached body 68 can take a holding position (see FIG. 10) of being opened for the base body 51. The first attached body 68 is rotatably moved between the storage position and the holding position.

The first attached body 68 is in a state of protruding backward from the cover body 52 at the holding position.

The second attached body 63 is stored in the storage recess part 52d and is rotatably moved between a storage position (see FIG. 17) of being closed for the base body 51 and a holding position (see FIG. 10) of being opened for the base body 51. The second attached body 63 is in a state of protruding backward from the cover body 52 at the holding position. In other words, the second attached body 63 is in a state of being stored for the base body 51 in the storage position and in a state of protruding backward from the cover body 52 in the holding position, as in the case of the first attached body 68.

The adaptor 3 is coupled to the digital camera 2 as follows.

First, the coupling parts 32 and 32 of the digital camera 2 are respectively inserted into the coupling recess parts 56a and 56a formed in the base body 51 of the adaptor 3.

Next, the adaptor 3 is rotated with respect to the digital camera 2. When the adaptor 3 is rotated, the locking pieces 53a and 53a of the adaptor 3 are respectively engaged with the locking protrusions 32a and 32a of the digital camera 2, and thus a movement of the adaptor 3 with respect to the digital camera 2 is restricted in the front and rear direction. In other words, the locking protrusions 32a and 32a form a state of being engaged with the locking pieces 53a and 53a of the adaptor 3.

At this time, simultaneously, the lock pin 33 of the digital camera 2 is pressed by the base body 51, and the lock pin 33 is drawn into the outer barrel 7 against a biasing force of the spring so that the adaptor 3 is rotated to a predetermined position and the locked hole 53b matches the lock pin 33. In addition, the lock pin 33 is made to protrude from the outer barrel 7 by the spring and is thus inserted into the locked hole 53b.

When the lock pin 33 is inserted into the locked hole 53b, the rotation of the adaptor 3 with respect to the digital camera 2 is restricted, and the adaptor 3 is coupled to the digital camera 2 in a locked state.

As described above, the digital camera 2 and the adaptor 3 are relatively rotated via the coupling parts 32 and 32, and thus the digital camera 2 and the adaptor 3 can be easily coupled to each other. Further, the coupled state is kept by the lock pin 33.

The unlock lever 2a is operated so that the lock pin 33 is drawn into the outer barrel 7, and the adaptor 3 is rotated about the digital camera 2 in a direction opposite to the time of the coupling in the unlocked state, thereby performing decoupling of the adaptor 3 from the digital camera 2. If the adaptor 3 is rotated about the digital camera 2 in a direction opposite to the time of the coupling, the engagement state between the locking pieces 53a and 53a and the locking protrusions 32a and 32a of the digital camera 2 is canceled. The adaptor 3 is moved backward with respect to the digital camera 2 in this state, and the coupling parts 32 and 32 are extracted from the coupling recess parts 56a and 56a, thereby decoupling the adaptor 3 from the digital camera 2.

The adaptor 3 is attached to the communication terminal 20 as follows.

First, the first attached body 68 and the second attached body 63 are respectively extracted from the storage recess parts 52c and 52d of the cover body 52 and are rotatably moved to the respective holding positions.

The first attached body 68 is then grasped and moved upward. The first attached body 68 is attached to a slider (not illustrated) inside the adaptor 3 and is movable upward. Further, a spring is attached to the slider, and the first attached body 68 is constantly biased in a direction of being close to the second attached body 63.

If the first attached body 66 is moved so as to be extracted upward, the first attached body 68 is gradually spaced apart from the second attached body 63. The first attached body 68 is moved upward to a position corresponding to the size of the communication terminal 20 to be attached.

The communication terminal 20 is then pinched by the first attached body 68 and the second attached body 63, and thus the adaptor 3 is attached to the communication terminal 20 (FIGS. 8 and 9). At this time, the first attached body 68 is biased to the second attached body 63 in a direction of being close thereto, and elastic bodies 61 and 61 (see FIGS. 8 and 10) provided to the first attached body 68 and the second attached body 63 are in close contact with the communication terminal 20.

Further, in a state in which the adaptor 3 is attached to the communication terminal 20, a holding protrusion 60 of the first attached body 68 and a holding protrusion 65 of the second attached body 63 are in a state of going around to the rear surface side of the communication terminal 20. Therefore, the adaptor 3 is prevented from falling forward from the communication terminal 20.

For the operations described above, the adaptor 3 has a configuration in which the second attached body 63 is set to a fixed position, and the first attached body 68 side is extended. Only the first attached body 68 that is an upper side is extended and contracted, and a gap between the first attached body 68 and the second attached body 63 is adjusted. Therefore, an imaging optical axis of the digital camera 2 is located at a position that is equal to or lower than the central point in the height direction (the short side direction of the casing of the communication terminal 20) of the display panel of the communication terminal 20. In addition, a bottom position of the digital camera 2 and a bottom position of the communication terminal 20 substantially match each other regardless of the size of the communication terminal 20.

For this season, a user can easily stably hold the communication terminal 20 attached with the imaging unit 1 regardless of the size of the communication terminal 20. In addition, even in a case where the communication terminal 20 attached with the imaging unit 1 is placed on a desk or the like as it is, a posture thereof is stable, and thus the communication terminal 20 attached therewith is also suitable for imaging in this state.

Further, the second attached body 63 is set to a fixed position, and thus there is an advantage in that an attachment state of the adaptor 3 to the communication terminal 20 is stable.

It should be noted that as illustrated in FIG. 10 the adaptor 3 is provided with a mark 68 that presents an upwardly extending configuration of the first attached body 68 side. With the mark 68, the user can recognize that the position of the first attached body 68 upwardly extends and easily understand how to attach the adaptor 3 when being attached to the communication terminal 20, thus improving the usability.

The first attached body 68 is grasped and moved upward so that the communication terminal 20 is extracted between the first attached body 68 and the second attached body 63, thereby removing the adaptor 3 from the communication terminal 20. If the upward force given to the first attached body 68 is removed after the communication terminal 20 is extracted between the first attached body 68 and the second attached body 63, the first attached body 68 is moved downward by the biasing force, and the first attached body 68 is returned to a state before being attached to the communication terminal 20.

Figure 18:
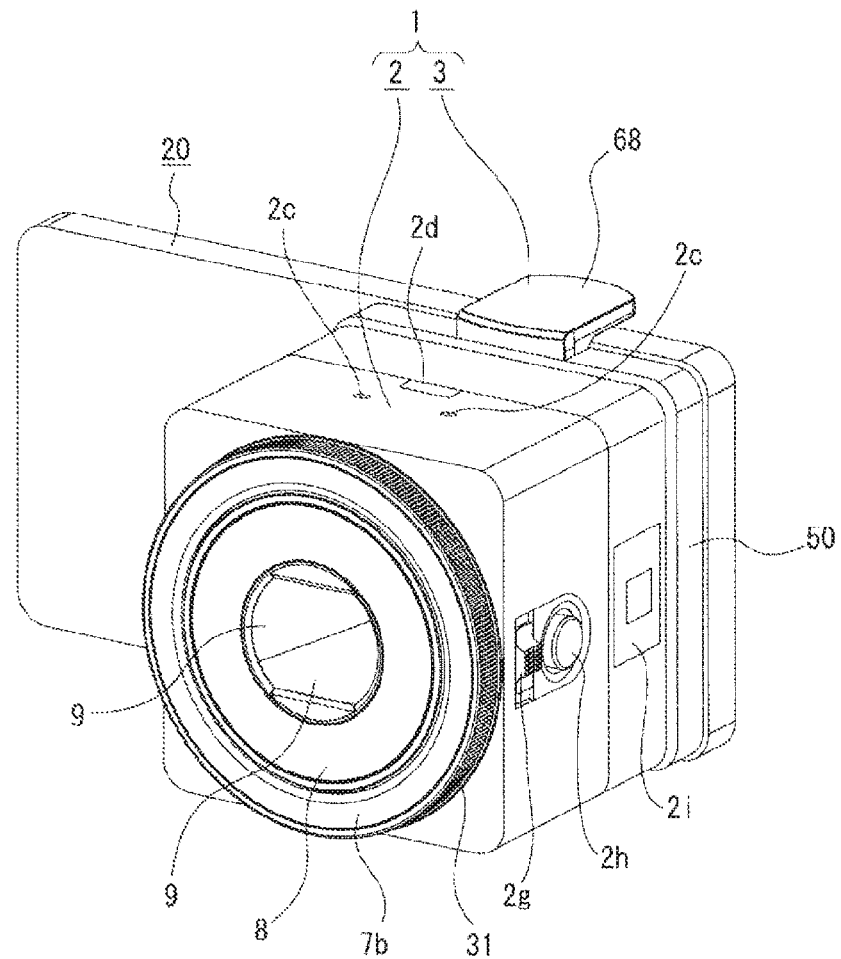
FIG. 18 is an explanatory view of a modified example of a shape according to another embodiment.

The structure of the imaging unit 1 by the digital camera 2 and the adaptor 3 has been described up to here, but the structure of the imaging unit 1 attached to the communication terminal 20 for use in the manner described above is variously conceived. The digital camera 2 has been described as one having a substantially cylindrical shape, but the shape of the digital camera 2 is not limited thereto. For example, as illustrated in FIG. 18, the shape of the outer casing may be a substantially rectangular parallelepiped. As a matter of course, a substantially elliptic cylinder, a substantially cylindrical shape having a partially notched circle, and the like are also conceivable.

Further, the internal constitution of the digital camera 2 can be assumed to be roughly the same as that of FIG. 4. In such a case, the display part 110 is the display part 2j provided to the circumferential surface part 7a, which is not for displaying a captured image.

Figure 19:
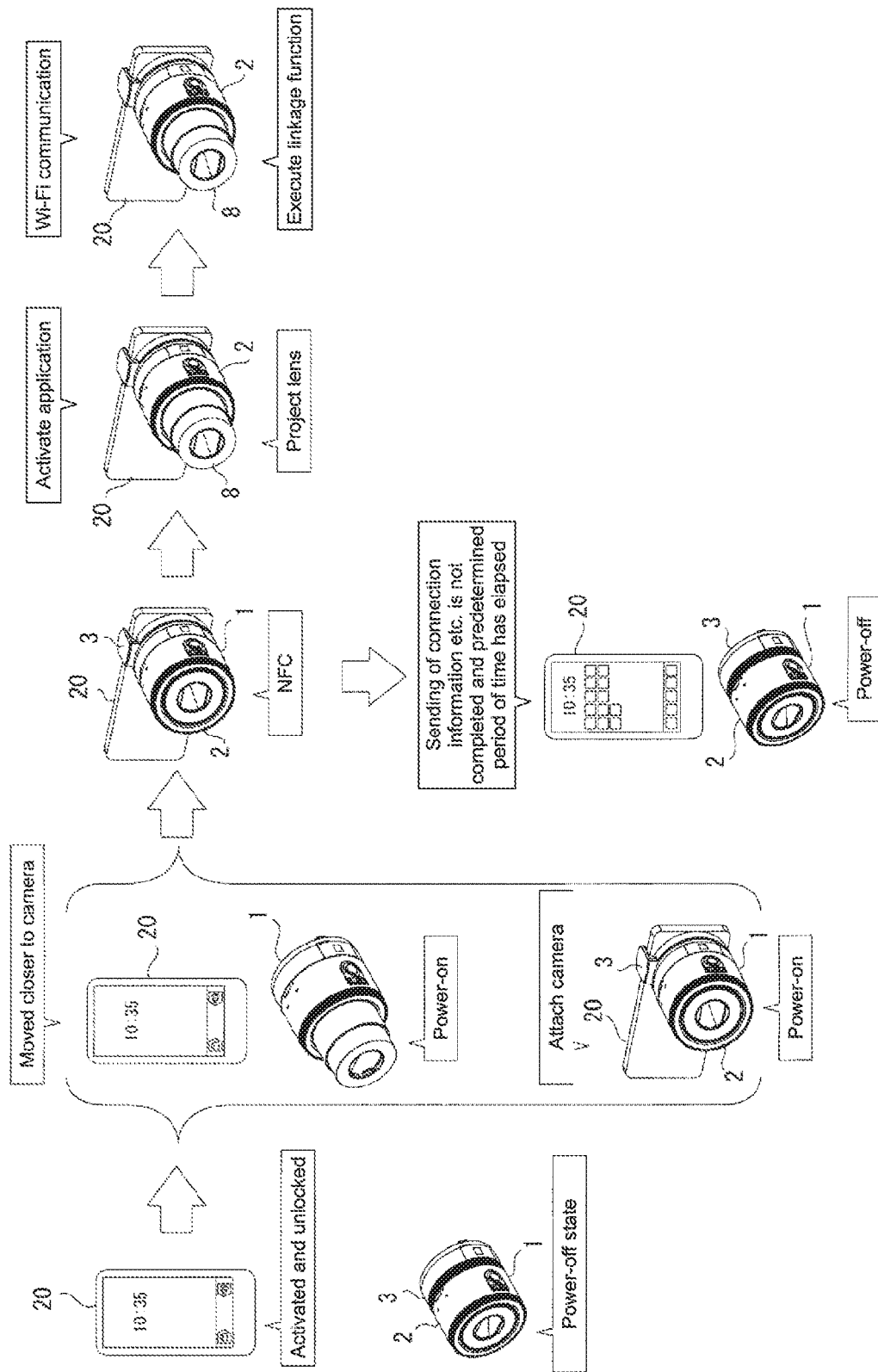
FIG. 19 is a state transition diagram for describing a series of operations according to another embodiment.

FIG. 19 is a state transition diagram for describing the above-mentioned series of operations of the imaging unit 1 in association with the operation of the communication terminal 20.

As illustrated in the figure, when the communication terminal 20 that is activated and unlocked is moved closer to the imaging unit 1 in a power-off state, the digital camera 2 is powered on (power-on) by NFC. It should be noted that the NFC is performed not only when the communication terminal 20 is simply moved closer to the imaging unit 1 but also when the digital camera 2 is installed to the communication terminal 20 by using the adaptor 3 as described above.

It should be noted that the imaging preparation operation such as projecting the inner barrel 8 is not performed at the point of time at which the communication terminal 20 is moved closer to the imaging unit 1 or the digital camera 2 is installed to the communication terminal 20.

Next, the communication terminal 20 receives Wi-Fi connection information and the like (Wi-Fi Config and AAR) from the digital camera 2 by the NFC. When the transmission of the connection information and the like is completed, the digital camera 2 performs the imaging preparation operation such as projecting the inner barrel 8. On the other hand, on the communication terminal 20 side, a predetermined application is activated according to the AAR and a Wi-Fi connection request is made to the digital camera 2 by using the Wi-Fi Config. When a Wi-Fi connection is completed between the communication terminal 20 and the digital camera 2, a linkage function using Wi-Fi communication is executed.

It should be noted that when the transmission of the connection information and the like is not completed and a predetermined period of time has elapsed, as illustrated in FIG. 19, the digital camera 2 performs power-off control, and thus it is possible to cut wasteful electric power consumption in the case where the digital camera 2 is activated due to malfunction. Further, even if the digital camera 2 is powered on due to malfunction, the inner barrel 8 is not projected. Thus, it is possible to prevent the lens from being damaged by the projection.

Therefore, when the digital camera 2 is correctly attached to the communication terminal 20 through the adaptor 3, operations of the power-on, the transmission of the connection information and the like by the NFC, the imaging preparation operation, and cooperation by the Wi-Fi connection are performed while when the communication terminal 20 comes close just momentarily, an unnecessary operation is not performed.

It should be noted that for the operations of FIG. 19, the digital camera 2 and the communication terminal 20 only need to perform the processing described with reference to FIGS. 5 and 7.

«5. Conclusion»

As described above, the digital cameras 10 and 2 according to the embodiments of the present disclosure perform the power-on control when the communication terminal 20 comes close thereto and perform, after the transmission of the Wi-Fi connection information and the like is competed by the NFC, the imaging preparation operation such as projecting the collapsible lens 13 or turning the power lamp 12 on. Thus, it is possible to prevent the user from moving the communication terminal 20 away from the digital camera 10 before the transmission of the Wi-Fi connection information and the like is completed and to avoid a failure of the Wi-Fi connection processing. In the case of the digital camera 2 that is used by being installed to the communication terminal 20, there is an advantage in that when the user moves the digital camera 2 and the communication terminal 20 closer to each other for just a moment without intension of installation, an unnecessary imaging preparation operation and the like are not performed.

Further, even if the digital camera is powered on due to malfunction, when the transmission of the Wi-Fi connection information and the like by the NFC is not completed, the digital camera is powered off. Thus, it is possible to cut wasteful electric power consumption. Further, at a point of time at which the digital camera is powered on, the collapsible lens 13 is not projected. Thus, it is possible to prevent the digital camera from being powered on due to malfunction, the collapsible lens 13 from being projected within the casing, and the lens from being damaged.

Hereinabove, suitable embodiments of the present disclosure have been described in detail with reference to the attached drawings, but the present technology is not limited to the examples described above. It is clear that a person having ordinary skill in the technical field of the present disclosure could arrive at various modified examples or amended examples without departing from the technical idea described in Claims, and it is understood that those examples naturally belong to the technical scope of the present disclosure.

For example, a computer program for causing hardware such as a CPU (Central Processing Unit), a ROM, or a RAM, which is incorporated into the digital camera 10 or the communication terminal 20, to exert the function of the digital camera 10 or the communication terminal 20 can also be created. Further, a computer-readable recording medium in which the computer program is stored is also provided.

Further, the steps in the processing of the digital camera 10 and the communication terminal 20 in this specification are not necessarily processed chronologically along the order disclosed in the attached flowcharts and sequence diagrams. For example, the steps in the processing of the digital camera 10 and the communication terminal 20 may be processed in the order different from the order described as the flowcharts and sequence diagrams or processed in parallel. Specifically, for example, Steps S209 and S215 illustrated in FIG. 7 may be processed in parallel or may be processed in reverse order. Further, Steps S233 and S236 to S251 illustrated. in FIG. 7 may be processed in parallel or may be processed in reverse order.

Further, the effects described in this specification are merely demonstrative or exemplary ones and are not restrictive ones. In other words, in addition to or instead of the effects described above, the technology according to the present disclosure may produce other effects understood by a person having ordinary skill in the art from the description of this specification.

It should be noted that the present technology can have the following configurations.

(1) An imaging device, including:
  a contactless communication part configured to perform contactless communication with an external device;
  a wireless communication part configured to perform wireless communication with the external device; and
  a control part configured to control power-on of the imaging device and connection of the wireless communication,
  in which the control part performs control to set the power of the imaging device ON upon detecting a signal by the contactless communication from the external device, transmits connection information for the wireless communication with the external device to the external device after the imaging device is powered on, and performs control such that connection by the wireless communication with the external device is made.

(2) The imaging device according to (1), in which
  the control part
    performs control such that the imaging device is powered on, when a polling command transmitted as a signal by the contactless communication is detected from the external device, and
    performs control such that an imaging preparation operation is performed, when the transmission of the connection information is complete.

(3) The imaging device according to (1) or (2), in which
  the control part performs control such that the imaging device is powered off, after the imaging device is powered on and when the transmission of the connection information is not completed within a predetermined period of time.

(4) The imaging device according to any of (1) to (3), in which the control part performs control such that information for specifying an application activated in the external device is transmitted together with the connection information.
(5) The imaging device according to (2), in which
the control part performs control such that the imaging device is powered on and the imaging preparation operation is performed, when an operation of a power button by a user is detected.
(6) The imaging device according to (2), in which
the imaging preparation operation is an operation involving a change in appearance or a notification of activation to a user.
(7) The imaging device according to (6), in which
the imaging preparation operation involving the change in appearance is an operation of driving a collapsible lens.
(8) The imaging device according to (6), in which
the imaging preparation operation involving the notification of activation to a user is an operation of reproducing a start-up sound.
(9) The imaging device according to (6), in which
the imaging preparation operation involving the notification of activation to a user is an operation of emitting light from a power lamp.
(10) The imaging device according to (1) to (9), in which
the contactless communication is near field communication (NFC).
(11) The imaging device according to (1) to (10), in which
the wireless communication is wireless fidelity (Wi-Fi) communication.
(12) A control method, including:
detecting a signal by contactless communication from an external device;
performing control such that the imaging device is powered on;
transmitting connection information for the wireless communication with the external device to the external device after the imaging device is powered on; and
performing control such that connection by the wireless communication with the external device is made.
(13) A program causing a computer to function as:
a contactless communication part configured to perform contactless communication with an external device;
a wireless communication part configured to perform wireless communication with the external device; and
a control part configured to control power-on of an imaging device and connection of the wireless communication,
in which the control part performs control to set the power of the imaging device ON upon detecting a signal by the contactless communication from the external device, transmits connection information for the wireless communication with the external device to the external device after the imaging device is powered on, and performs control such that connection by the wireless communication with the external device is made.

DESCRIPTION OF REFERENCE NUMERALS 1 imaging unit
2 imaging device
3 adaptor
7 outer barrel
8 inner barrel
10, 30 digital camera
12, 320 power lamp
13, 310 collapsible lens
14 shutter button
15 power button
100 control part
102 operation input part
104 imaging part
106 image processing part
107 recording/reading part
109 recording medium
110 display part
111 speaker
113 power supply part
114 time management part
115 storage part
116 GPS receiving part
117 gyroscope
120 NFC part
121 NFC antenna
122 Wi-Fi communication part
123 Wi-Fi antenna
20 communication terminal
21 display part

The invention claimed is:
1. An imaging device, comprising:
circuitry configured to:
perform a contactless communication with an external device;
perform a wireless communication with the external device; and
control a power-on of at least one component of the imaging device and a connection of the wireless communication,
wherein the circuitry sets a power of the at least one component ON in response to starting the contactless communication with the external device when a polling command transmitted as a radio signal by the contactless communication is received from the external device, transmits connection information for the wireless communication with the external device to the external device after the at least one component of the imaging device is powered on by the contactless communication, controls to make the connection of the wireless communication with the external device, and performs an imaging preparation operation when the transmission of the connection information is completed.
2. The imaging device according to claim 1, wherein
the circuitry is configured to power off the at least one component of the imaging device when the transmission of the connection information is not completed within a predetermined period of time.
3. The imaging device according to claim 1, wherein
the circuitry is configured to transmit an information for specifying an application activated in the external device together with the connection information.
4. The imaging device according to claim 1, wherein
the circuitry is configured to power on the at least one component of the imaging device and perform the imaging preparation operation when an operation of a power button by a user is detected.
5. The imaging device according to claim 1, wherein
the imaging preparation operation is an operation involving a change in an appearance or a notification of an activation to a user.
6. The imaging device according to claim 5, wherein the imaging preparation operation involving the change in the appearance is an operation of driving a collapsible lens.

7. The imaging device according to claim 5, wherein the imaging preparation operation involving the notification of the activation to the user is an operation of reproducing a start-up sound.

8. The imaging device according to claim 5, wherein the imaging preparation operation involving the notification of the activation to the user is an operation of emitting light from a power lamp.

9. The imaging device according to claim 1, wherein the contactless communication is a near field communication (NFC).

10. A control method of an imaging device, the control method comprising:
 performing, by circuitry of the imaging device, a contactless communication with an external device;
 performing a wireless communication with the external device; and
 controlling a power-on of at least one component of the imaging device and a connection of the wireless communication,
 wherein the circuitry sets a power of the at least one component ON in response to starting the contactless communication with the external device when a polling command transmitted as a radio signal by the contactless communication is received from the external device, transmits connection information for the wireless communication with the external device to the external device after the at least one component of the imaging device is powered on by the contactless communication, controls to make the connection of the wireless communication with the external device, and performs an imaging preparation operation when the transmission of the connection information is completed.

11. The control method according to claim 10, further comprising:
 powering off the at least one component of the imaging device when the transmission of the connection information is not completed within a predetermined period of time.

12. The control method according to claim 10, further comprising:
 transmitting an information for specifying an application activated in the external device together with the connection information.

13. The control method according to claim 10, further comprising:
 powering on the at least one component of the imaging device and perform the imaging preparation operation when an operation of a power button by a user is detected.

14. The control method according to claim 10, wherein the imaging preparation operation is an operation involving a change in an appearance or a notification of an activation to a user.

15. The control method according to claim 14, wherein the imaging preparation operation involving the change in the appearance is an operation of driving a collapsible lens.

16. The control method according to claim 14, wherein the imaging preparation operation involving the notification of the activation to the user is an operation of reproducing a start-up sound.

17. The control method according to claim 14, wherein the imaging preparation operation involving the notification of the activation to the user is an operation of emitting light from a power lamp.

18. The control method according to claim 10, wherein the contactless communication is a near field communication (NFC).

* * * * *